US011874508B2

(12) United States Patent
Haase et al.

(10) Patent No.: US 11,874,508 B2
(45) Date of Patent: Jan. 16, 2024

(54) OPTICAL FERRULES AND OPTICAL FERRULE MOLDS

(71) Applicant: 3M INNOVATIVE PROPERTIES COMPANY, St. Paul, MN (US)

(72) Inventors: Michael A Haase, St. Paul, MN (US); Alexander R. Mathews, Austin, TX (US); Terry L. Smith, Roseville, MN (US); James M. Nelson, Lino Lakes, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 18/093,965

(22) Filed: Jan. 6, 2023

(65) Prior Publication Data
US 2023/0144989 A1    May 11, 2023

Related U.S. Application Data

(60) Continuation of application No. 17/716,052, filed on Apr. 8, 2022, now Pat. No. 11,579,375, which is a (Continued)

(51) Int. Cl.
*G02B 6/38* (2006.01)
*G02B 6/36* (2006.01)

(52) U.S. Cl.
CPC ........... *G02B 6/3865* (2013.01); *G02B 6/366* (2013.01); *G02B 6/383* (2013.01); *G02B 6/3839* (2013.01); *G02B 6/3853* (2013.01); *G02B 6/3885* (2013.01)

(58) Field of Classification Search
CPC ...... G02B 6/3865; G02B 6/366; G02B 6/383; G02B 6/3833; G02B 6/3839; G02B 6/3853; G02B 6/3885
See application file for complete search history.

(56) References Cited

U.S. PATENT DOCUMENTS 5,381,498 A    1/1995    Bylander
6,026,210 A    2/2000    Berglund
(Continued)

FOREIGN PATENT DOCUMENTS

CN    102211381    10/2011
JP    2005-274702    10/2005
(Continued)

OTHER PUBLICATIONS

PCT International Search Report from PCT/US2016/056324, dated Dec. 22, 2016, 4 pages.

*Primary Examiner* — Michael P Mooney
(74) *Attorney, Agent, or Firm* — Jonathan L. Tolstedt

(57) ABSTRACT

A unitary optical ferrule is molded to include one or more elements for receiving and securing one or more optical waveguides one or more elements for affecting one or more characteristics of light from the optical waveguide while propagating the light within the ferrule. The optical ferrule also includes one or more first alignment features and one or more second alignment features that, when the ferrule is mated with a mating ferrule, each controls alignment of the ferrule with the mating ferrule along three mechanical degrees of freedom. The surface of the optical ferrule can be divided along the thickness axis into a first section and an opposing second section, wherein the first section of the surface includes the receiving and securing elements, the light affecting elements, and the first alignment features and the second section of the surface includes the second alignment features.

3 Claims, 20 Drawing Sheets

Related U.S. Application Data continuation of application No. 16/946,248, filed on Jun. 12, 2020, now Pat. No. 11,327,244, which is a division of application No. 15/758,743, filed as application No. PCT/US2016/056324 on Oct. 11, 2016, now Pat. No. 10,746,942.

(60) Provisional application No. 62/239,996, filed on Oct. 12, 2015.

(56) References Cited

U.S. PATENT DOCUMENTS

| | | | |
|---|---|---|---|
| 6,075,612 | A | 6/2000 | Mandella |
| 6,287,017 | B1 | 9/2001 | Katsura |
| 6,624,512 | B2 | 9/2003 | Kurusu |
| 6,758,602 | B2 | 7/2004 | Yamaguchi |
| 7,066,657 | B2 | 6/2006 | Murali |
| 7,454,105 | B2 | 11/2008 | Yi |
| 7,473,038 | B2 | 1/2009 | Fujiwara |
| 7,534,052 | B2 | 5/2009 | Fujiwara |
| 7,726,885 | B2 | 6/2010 | Nishimura |
| 8,165,432 | B2 | 4/2012 | Ohta |
| 2010/0135618 | A1* | 6/2010 | Howard ............... G02B 6/36 385/136 |
| 2011/0317959 | A1 | 12/2011 | Ohta |
| 2012/0033921 | A1 | 2/2012 | Haley et al. |
| 2012/0063725 | A1* | 3/2012 | Meadowcroft ...... G02B 6/3885 385/88 |
| 2014/0143996 | A1* | 5/2014 | Bhagavatula ........ G02B 6/3885 29/428 |
| 2015/0060640 | A1 | 3/2015 | Tanazawa |
| 2015/0198771 | A1* | 7/2015 | Nakama ............... G02B 6/3861 385/80 |
| 2016/0231521 | A1 | 8/2016 | Smith |
| 2016/0252687 | A1* | 9/2016 | Badihi ................. G02B 6/423 385/14 |
| 2017/0357062 | A1* | 12/2017 | Watanabe ........... G02B 6/4255 |

FOREIGN PATENT DOCUMENTS

| | | |
|---|---|---|
| JP | 2006-091929 | 4/2006 |
| JP | 2011-215303 | 10/2011 |
| WO | WO 2014/055361 | 4/2014 |
| WO | WO 2015-038941 | 3/2015 |

* cited by examiner

OPTICAL FERRULES AND OPTICAL FERRULE MOLDS

CROSS REFERENCE TO RELATED APPLICATION

This application is a continuation filing of U.S. application Ser. No. 17/716,052, filed Apr. 8, 2022, now allowed, which is a continuation of Ser. No. 16/946,248, filed Jun. 12, 2020, issued as U.S. Pat. No. 11,327,244, which is a divisional of U.S. application Ser. No. 15/758,743, filed Mar. 9, 2018, issued as U.S. Pat. No. 10,746,942, which is a national stage filing under 35 C.F.R. 371 of PCT/US2016/056324, filed Oct. 11, 2016, which claims the benefit of U.S. Provisional Application No. 62/239,996, filed Oct. 12, 2015, the disclosures of which are incorporated by reference in their entireties herein.

TECHNICAL FIELD

This disclosure relates generally to optical ferrules and to molds for making optical ferrules.

BACKGROUND

Optical connectors can be used for optical communications in a variety of applications including telecommunications networks, local area networks, data center links, and internal links in computer devices. Expanded optical beams may be used in connectors to provide an optical connection that is less sensitive to dust and other forms of contamination and so that alignment tolerances may be relaxed. Generally, an expanded beam is a beam that is larger in diameter than the core of an associated optical waveguide (usually an optical fiber, e.g., a multi-mode fiber for a multi-mode communication system). The connector is generally considered an expanded beam connector if there is an expanded beam at a connection point. The expanded beam is typically obtained by diverging a light beam from a source or optical fiber. In many cases, the diverging beam is processed by optical elements such as a lens or mirror into an expanded beam that is approximately collimated. The expanded beam is then received by focusing of the beam via another lens or mirror. Optical connectors including expanded beam optical connectors can include optical ferrules that include elements for receiving and securing optical waveguides, elements for affecting light from the optical waveguides, and features for aligning the optical ferrule to a mating ferrule.

BRIEF SUMMARY

Some embodiments are directed to a molded unitary optical ferrule that includes one or more parting line artifacts, the one or more parting line artifacts including a parting line artifact extending substantially around an external perimeter of the unitary ferrule. The parting line artifacts divide the surface of the optical ferrule along a thickness axis into a first section and an opposing second section. The first section of the surface includes one or more elements configured for receiving and securing a optical waveguide, one or more elements configured for affecting one or more characteristics of light from the optical waveguide while propagating the light within the unitary ferrule and one or more first alignment features that, when the ferrule is mated with a mating ferrule, control translation of the ferrule along a first lateral axis orthogonal to the thickness axis, translation of the ferrule along a second lateral axis orthogonal to both the thickness axis and the first lateral axis, and rotation of the ferrule around the thickness axis. The second section includes at least one second alignment feature that, when the ferrule is mated with a mating ferrule, controls translation of the ferrule along the thickness axis, and rotation of the ferrule around the first and second lateral axes.

According to some embodiments, a molded unitary optical ferrule includes one or more parting line artifacts, including a parting line artifact extending substantially around an external perimeter of the unitary ferrule, the parting line artifacts dividing a surface of the optical ferrule along a thickness axis into a first section and an opposing second section. The ferrule includes one or more elements configured for receiving and securing an optical waveguide, one or more elements configured for affecting one or more characteristics of light from the optical waveguide while propagating the light within the unitary ferrule, and at least one planar surface configured to make contact with a planar mating surface of a mating ferrule during mating of the ferrule. The ferrule also includes one or more alignment features that, when the ferrule mates with the mating ferrule, primarily control rotation of the ferrule around the thickness axis, translation of the ferrule along a first lateral axis orthogonal to the thickness axis, and translation of the ferrule along a second lateral axis orthogonal to the thickness axis and to the first lateral axis. The first section of the ferrule contains the one or more elements configured for receiving and securing an optical waveguide, the one or more elements configured for affecting one or more characteristics of light, and the alignment features and the second section of the ferrule includes the planar surface.

In some embodiments, a molded unitary optical ferrule includes one or more parting line artifacts, including a parting line artifact extending substantially around an external perimeter of the unitary ferrule, the parting line artifacts dividing a surface of the optical ferrule along a thickness axis into a first section and an opposing second section. The ferrule includes one or more elements configured for receiving and securing an optical waveguide, one or more elements configured for affecting one or more characteristics of light from the optical waveguide while propagating the light within the unitary ferrule, a sliding surface that, during mating of the ferrule and a mating ferrule, facilitates sliding of the ferrule against a sliding surface of the mating ferrule along a ferrule mating axis, when the ferrule is mated with the mating ferrule, the sliding surface is configured to control rotation of the ferrule around the ferrule mating axis, translation of the ferrule along a thickness axis orthogonal to the ferrule mating axis, and rotation of the ferrule around a lateral axis orthogonal to the ferrule mating axis and the thickness axis, and one or more alignment features that, when the ferrule is mated with the mating ferrule, primarily control translation of the ferrule along the ferrule mating axis, translation of the ferrule along the lateral axis, and rotation of the ferrule around the thickness axis. The first section of the surface includes the receiving and securing elements, the light affecting elements, and the alignment features and the second section of the surface includes the sliding surface.

Some embodiments are directed to an injection mold that includes a first mold side and a second mold side that fit together to define a cavity for molding a unitary optical ferrule, and configured to separate along a parting axis. The unitary optical ferrule is molded with a thickness axis parallel to the parting axis. The first side of the mold includes first mold features configured to mold: a plurality of first elements configured for receiving and securing an optical waveguide and for affecting one or more characteristics of light from the optical waveguide while propagating the light within the unitary ferrule and one or more first alignment features that, when the ferrule is mated with a mating ferrule, control translation of the ferrule along a first lateral axis orthogonal to the thickness axis, translation of the ferrule along a second lateral axis orthogonal to both the thickness axis and the first lateral axis, and rotation of the ferrule around the thickness axis. The second mold side includes second mold features configured to mold one or more second alignment features that, when the ferrule is mated with a mating ferrule, control translation of the ferrule along the thickness axis, and rotation of the ferrule around the first and second lateral axes.

Embodiments are directed to an injection mold including a first mold side and a second mold side that fit together to define a cavity for molding a unitary optical ferrule and configured to separate along a parting axis. The unitary optical ferrule is molded with a thickness axis parallel to the parting axis. The first mold side has first mold features configured to mold: a plurality of first elements configured for receiving and securing an optical waveguide and for affecting one or more characteristics of light from the optical waveguide while propagating the light within the unitary ferrule and one or more first alignment features that, when the ferrule is mated with a mating ferrule, control translation of the ferrule along a first lateral axis orthogonal to the thickness axis, translation of the ferrule along a second lateral axis orthogonal to both the thickness axis and the first lateral axis, and rotation of the ferrule around the thickness axis. The second mold side includes second mold features configured to mold one or more second alignment features that, when the ferrule is mated with a mating ferrule, control translation of the ferrule along the thickness axis, and rotation of the ferrule around the first and second lateral axes.

Some embodiments involve an optical ferrule that includes one or more receiving elements and one or more light affecting elements. Each receiving element is configured for receiving and securing an optical waveguide. Each light affecting element includes a light redirecting feature comprising a curved lens in an optical path of light from the optical waveguide, the receiving element configured to align the waveguide with the lens, and a planar region at least partially surrounding the lens and comprising a first reference surface for the lens. The light affecting element includes an intermediate surface that extends between the receiving element and the light redirecting feature and comprising a second reference surface, wherein the first reference surface is disposed at a predetermined angle with respect to the second reference surface, the angle determining a positional relationship between the lens and the waveguide.

According to some embodiments, an optical ferrule includes one or more receiving elements and one or more light affecting elements. Each receiving element is configured for receiving and securing an optical waveguide. Each light affecting element comprises a light redirecting feature. Each light redirecting feature comprises a curved lens in an optical path of light from the optical waveguide, the receiving element configured to align the waveguide with the lens and a planar region at least partially surrounding the lens the planar region comprising a first reference surface for the lens. The first reference surface is disposed at an angle with respect to a second reference surface of the optical ferrule; the angle determines a positional relationship between the lens and the waveguide.

Some embodiments involve an injection mold. The mold includes a first mold side and a second mold side that fit together to define a cavity for molding a unitary optical ferrule. The cavity is configured to separate along a parting axis, the unitary optical ferrule being molded with a thickness axis parallel to the parting axis. The first mold side includes mold features configured to mold one or more light affecting elements, each light affecting element a light redirecting feature comprising a curved lens in an optical path of light from the optical waveguide, the receiving element configured to align the waveguide with the lens and a planar region at least partially surrounding the lens and comprising a first reference surface for a position of the lens. The first reference surface is disposed at an angle with respect to a second reference surface of the optical ferrule that determines a positional relationship between the lens and the waveguide.

BRIEF DESCRIPTION OF DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF ILLUSTRATIVE EMBODIMENTS

Optical connectors including expanded beam optical connectors can include optical ferrules (also referred to herein as "light coupling units" or "LCUs") that are formed as unitary, molded structures. Some embodiments described herein involve molded optical ferrules and molds for making optical ferrules. Molding ferrules involves the use of two primary mold parts which are referred to herein as the "first mold side" and the "second mold side". The first mold side includes first mold features configured to mold a first set of the features of the optical ferrule. The second mold side includes second mold features configured to mold a second set of the features of the optical ferrule. When the mold is operated, the two halves are brought together along what is referred to herein as the "parting axis", the first side and the second side define a cavity for molding a unitary optical ferrule. A flowable mold material is injected or otherwise placed into the cavity and hardens, e.g., due to cooling of the mold material, to form the unitary ferrule. The mold halves are then separated along the parting axis to allow the ferrule to be removed. Some materials useful for molded ferrules include thermoplastic and thermosetting polymers, ceramics, metals, glasses, etc.

Figure 1A:
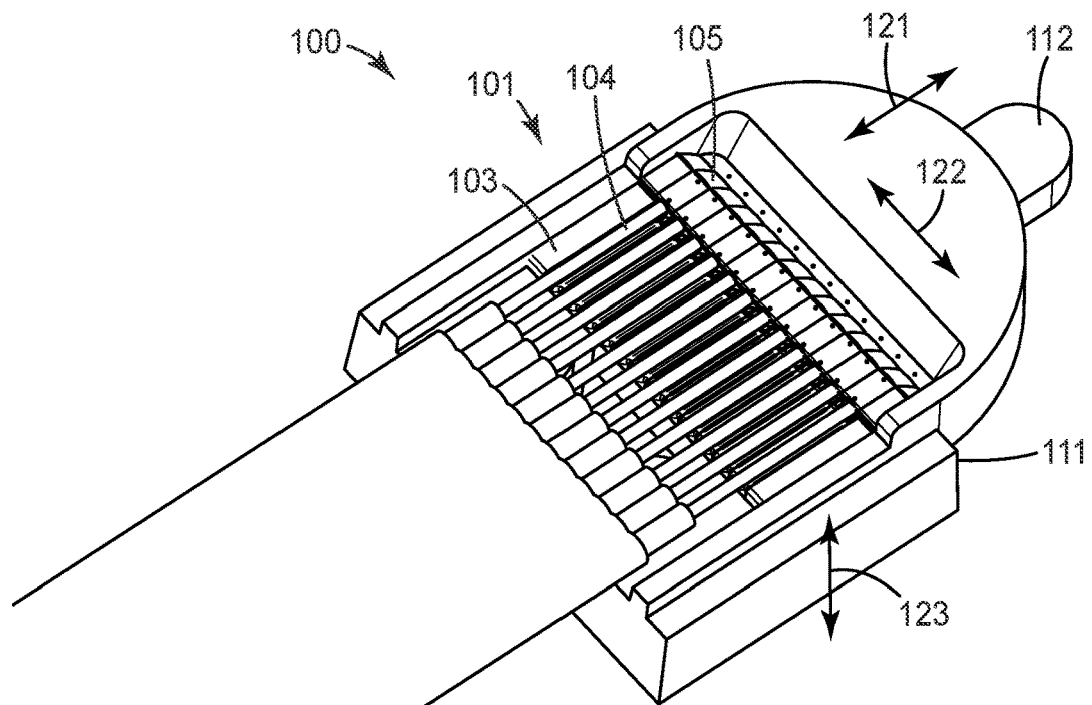
FIG. 1A illustrates a first side of the optical ferrule in accordance with some embodiments.
Figure 1B:
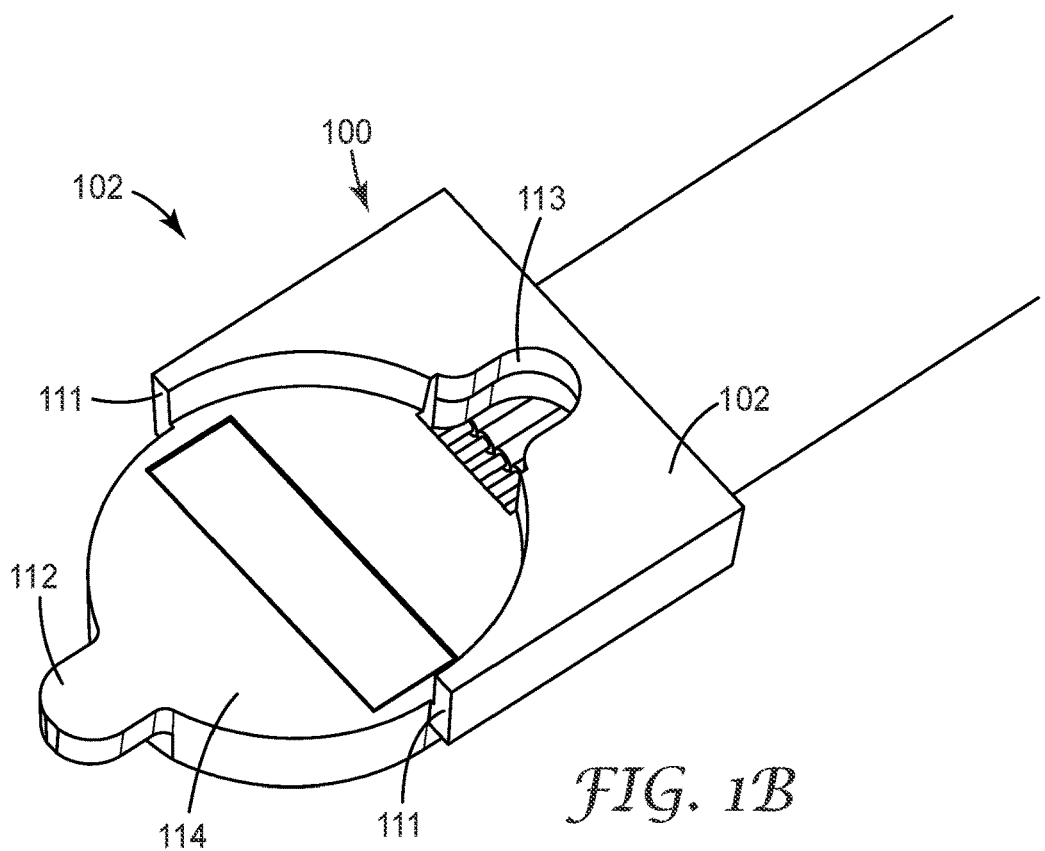
FIG. 1B illustrates a second side of the ferrule of FIG. 1A.

FIG. 1A and FIG. 1B are diagrams of a unitary optical ferrule 100. A unitary optical ferrule is a single piece structure that includes one or more elements for receiving and securing a waveguide, one or more elements for affecting light from the waveguide, and one or more alignment features.

FIG. 1A illustrates a first side 101 of the optical ferrule 100 and FIG. 1B illustrates a second side 102 of the ferrule 100. For purposes of discussion and without limitation to any particular orientation of the ferrule, the first side 101 may be designated as the top side and the second side 102 as the bottom side. The optical ferrule 100 includes at least one element 103 for receiving and securing an optical waveguide 104 and at least one element 105 for affecting one or more characteristics of light from the optical waveguide 104 while propagating the light within the optical ferrule 100. The optical ferrule 100 includes one or more alignment features 111-114 for aligning the optical ferrule 100 with a mating optical ferrule (not shown in FIGS. 1A and 1B).

Alignment of the optical ferrule 100 with the mating optical ferrule is achieved by controlling six mechanical degrees of freedom in three dimensions, the six mechanical degrees of freedom being translation along and rotation around each of three orthogonal axes 121, 122, 123. For purposes of discussion, axis 121 is referred to herein as the first lateral axis, axis 122 is referred to herein as the second lateral axis, and axis 123 is referred to as the thickness axis. Axis 121 can be the ferrule mating axis. The six mechanical degrees of freedom controlled after mating the ferrule to a mating ferrule include translation along the first lateral axis 121, translation along the second lateral axis 122, translation along the thickness axis 123, rotation around the first lateral axis 121, rotation around the second lateral axis 122, and rotation around the thickness axis 123. In the example shown in FIGS. 1A and 1B, when the ferrule 100 is mated with a mating ferrule, forward stops 111 contact forward stops of the mating ferrule to control translation along the first lateral axis 121; pin 112 of ferrule 100 engages with a socket of the mating ferrule and socket 113 of ferrule 100 engages with a pin of the mating ferrule to control translation of the ferrule 100 along the second lateral axis 122. The forward stops 111, and/or the pin 112 and socket 113 may be used to control the rotation of the ferrule around the thickness axis 123. When the ferrule 100 is mated with a mating ferrule, the surface 114 of ferrule 100 engages with a surface of the mating ferrule to control translation of the ferrule 100 along the thickness axis 122, rotation of the ferrule around the first lateral axis 121, and rotation of the ferrule around the lateral 122 axis. In some embodiments, the socket 113 is formed by at least a portion of a hole that extends through the thickness of the ferrule 100.

Additional information regarding optical ferrules having the alignment features disclosed herein is provided in commonly owned and concurrently filed U.S. Patent Application Ser. 62/240,069, having the title "Optical Ferrules,", which is incorporated herein by reference.

The error in alignment of the mold sides can be significant, e.g., on the order of about 10 µm or more. If the receiving and securing elements, the light affecting elements, and mechanical alignment features are not molded by a single side of the mold, the receiving and securing elements and the light affecting elements may be misaligned with the alignment features. When such a defective ferrule is mated with a mating ferrule, the alignment features cause the receiving and securing elements and the light affecting elements to be improperly aligned with the mating ferrule, thereby increasing the optical insertion loss of the connector.

Some embodiments disclosed herein involve a mold for molding an optical ferrule, the mold including a first mold side and a second mold side that fit together to define a cavity for molding a unitary optical ferrule. The unitary optical ferrule is molded with a thickness axis parallel to the parting axis of the mold. In some embodiments, the first mold side may comprise a single mold insert that includes first mold features configured to mold one or more elements configured for receiving and securing an optical waveguide and one or more elements configured for affecting characteristics of light from the optical waveguide while propagating the light within the unitary ferrule. The first mold features are also configured to mold one or more first alignment features that, when the ferrule is mated to a mating ferrule, primarily control translation of the ferrule along lateral axes orthogonal to the thickness axis, and rotation of the ferrule around the thickness. The second mold side includes second mold features that are configured to mold one or more second alignment features that, when the ferrule is mated with a mating ferrule, primarily control translation of the ferrule along the thickness axis, and rotations of the ferrule around the lateral axes.

In some embodiments, the second alignment feature includes a planar surface that is normal to the parting axis of the mold. In these embodiments, the molded ferrule can be insensitive to nominal misalignment of the mold sides. In some embodiments, one of the lateral axes is a mating axis of the ferrule.

Some embodiments disclosed herein are directed to a unitary optical ferrule made by the mold sides discussed above, the optical ferrule molded with a thickness axis parallel to the mold parting axis, and including one or more elements configured for receiving and securing an optical waveguide and one or more elements for affecting one or more characteristics of light from the optical waveguide while propagating the light within the unitary ferrule. The optical ferrule includes one or more first alignment features that, when the ferrule is mated with a mating ferrule, control translation of the ferrule along lateral axes orthogonal to the thickness axis, and rotation of the ferrule around the thickness axis. The optical ferrule includes at least one second alignment feature that, when the ferrule is mated with a mating ferrule, controls translation of the ferrule along the thickness axis, rotation of the ferrule around the lateral axes. The surface of the optical ferrule can be divided along the thickness axis into a first section of the surface and a second section of the surface. The first section of the ferrule contains the receiving and securing elements, the light affecting elements, and the first alignment features and the second section of the ferrule includes the second alignment features and the light transmitting region through which light is coupled to a mated ferrule. In some embodiments the first section is molded by the first side of a mold, and the second section molded by the second side of a mold; a mold parting line artifact separates the first section of the surface from the second section of the surface. Parting line artifacts are features in the molded part that occur due to the misalignment or imperfect contact between the sides of the mold at the parting line. The artifact may take the form of a small step or molding flash.

Figure 1C:
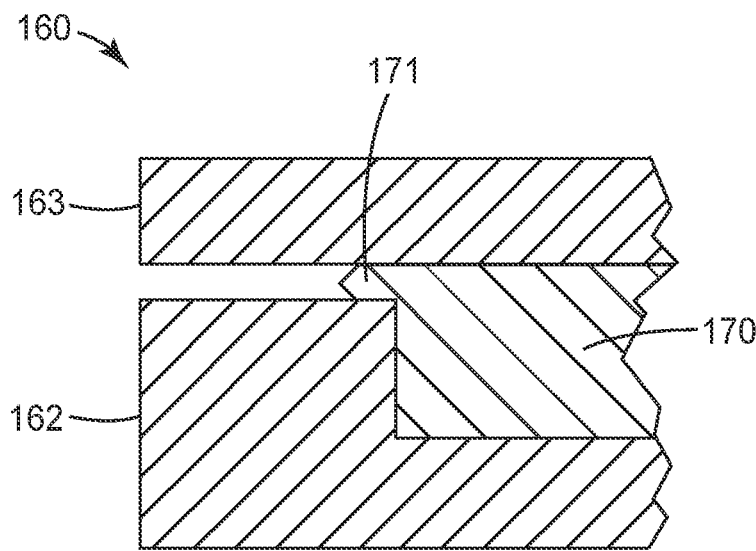
FIG. 1C illustrates a flash parting line artifact.
Figure 1D:
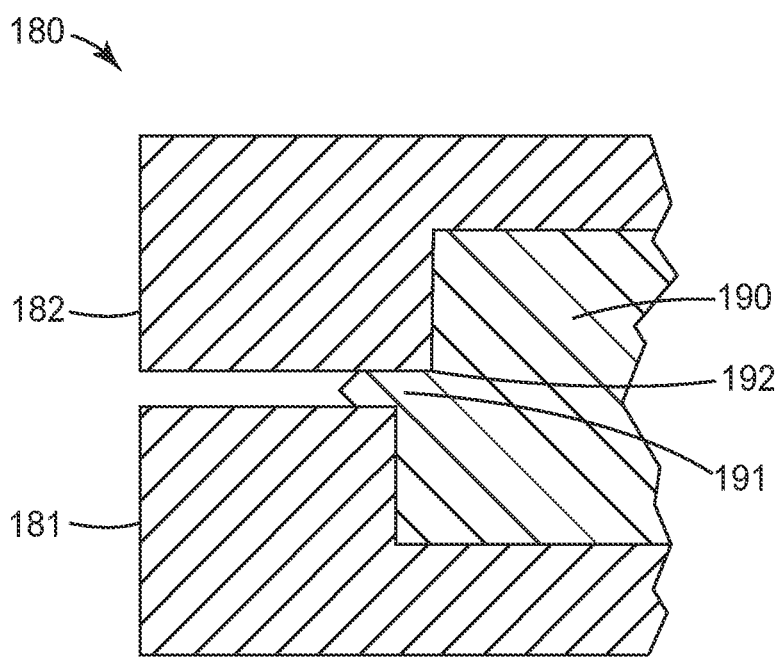
FIG. 1D illustrates a step parting line artifact.

FIG. 1C illustrates a portion of a cross sectional view of first 161 and second 162 sides of a mold and molded material 170 between the first and second mold sides 161, 162. A flash parting line artifact 171 occurs where the molded material 170 penetrates a small gap between the mold sides 161, 162. FIG. 1D illustrates a portion of a cross sectional view of first 181 and second 182 sides of a mold 180 with a mold material 190 between the first and second mold sides 181, 182. A flash parting line artifact 191 occurs where the mold material 190 penetrates a small gap between the mold sides 181, 182. A step parting line artifact 192 occurs where the second side of the mold includes a vertical wall that is slightly misaligned with the vertical wall of the first side and the molded material penetrates a small gap between mold sides 181, 182.

Figure 2A:
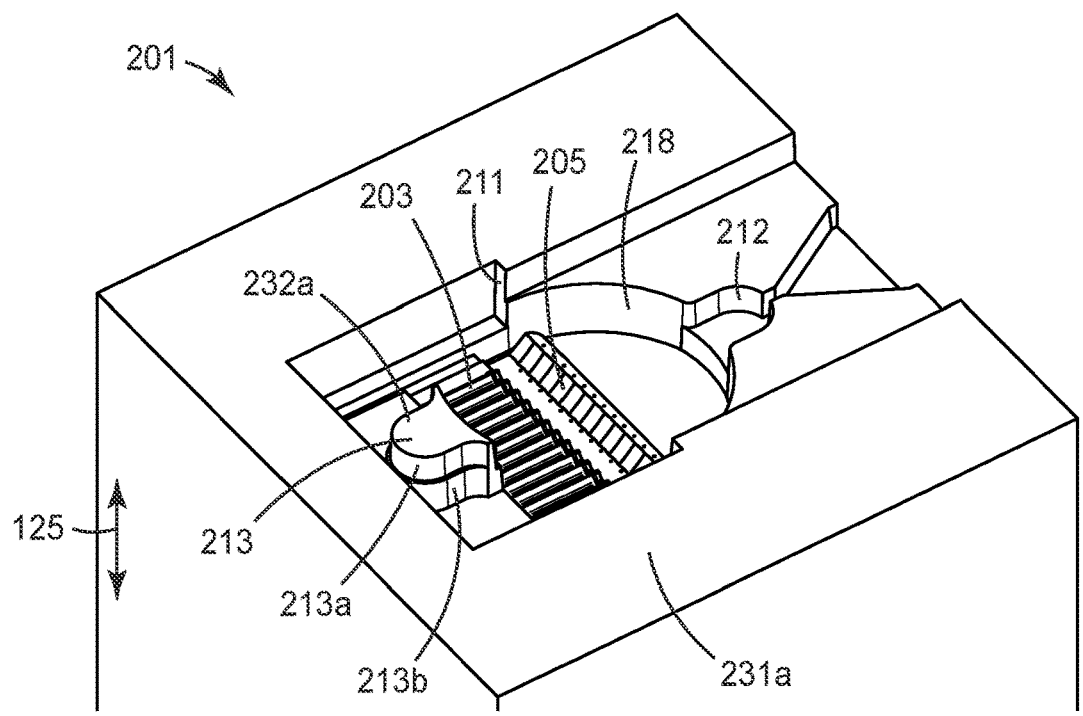
FIGS. 2A and 2B illustrate first and second sides of a mold according to some embodiments.
Figure 2B:
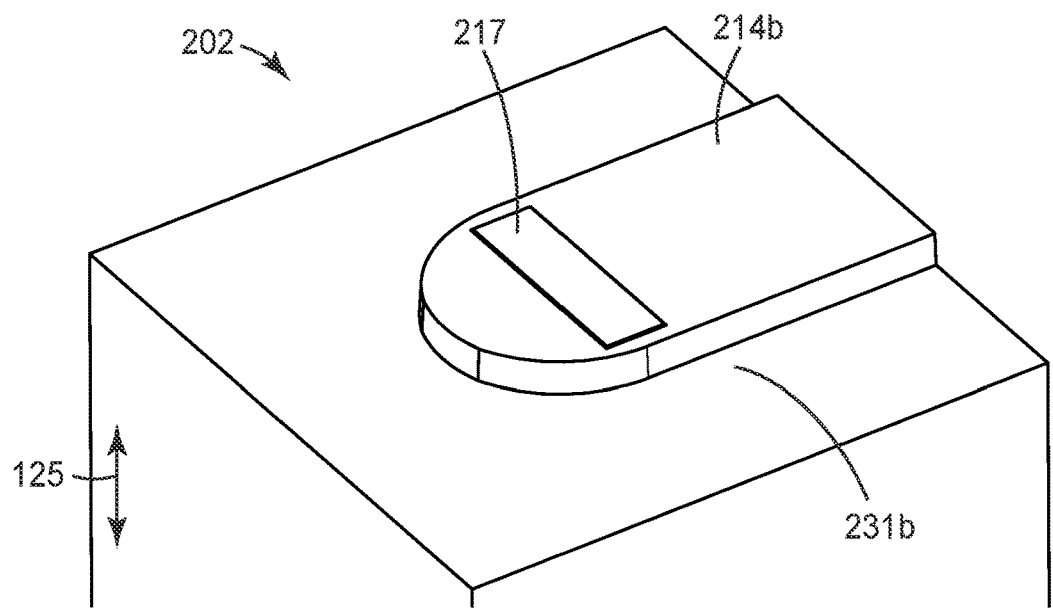

FIGS. 2A and 2B illustrate first and second sides 201, 202 of a mold, respectively, according to some embodiments. Note that the figures of the mold sides presented herein are schematic and are intended to facilitate understanding of the various embodiments. In these schematic diagrams, some features that are not necessary to understand concepts of the embodiments have been omitted, e.g., extraction pins, optional multiple inserts, and multiple cavities, etc. Those skilled in the art of injection molding will understand that these features may be present in actual molds. FIGS. 3A through 3D show a unitary optical ferrule 300 made using the mold of FIGS. 2A and 2B. The first mold side 201 includes first mold features 203, 205, 211, 212, 213 and the second mold side 202 includes second mold feature 214 and 217. Mold features 203 of mold side 201 are configured to mold one or more elements 303, e.g., grooves, of the optical ferrule 300 configured for receiving and securing an optical waveguide. Mold features 205 are configured to mold one or more elements 305 of the optical ferrule 300 configured for affecting characteristics of light from the optical waveguide while propagating the light within the optical ferrule 300. Although optical ferrule 300 includes multiple receiving and securing elements 303 and multiple light affecting elements 305, some unitary optical ferrules can include a single receiving and securing element 303 and a single light affecting element 305.

The first mold side 201 includes mold features 211, 212, 213 configured to mold one or more first alignment features 311, 312, 313. When mated with a mating optical ferrule (not shown), alignment features 311 of the optical ferrule 300 control translation of the ferrule 300 along a first lateral axis 121. Features 311 shown in the example optical ferrule 300 of in FIGS. 3A through 3D are forward stops that engage with forward stops of a mating ferrule to set the mated distance between light affecting elements of the optical ferrule and light affecting elements of the mating ferrule. The forward stops 311, when engaged with forward stops of the mating ferrule, also control rotation of the optical ferrule 300 around the thickness axis 123. In this example, the forward stops 311 are located along a line 126 on the horizontal mating surface 314, the line 126 passing through the centers of the optical beams. The forward stops 311 are formed by the first side 201 of the mold.

Mold features 212, 213 are configured to mold alignment features 312, 313 in the optical ferrule 300. In the example ferrule shown in FIGS. 3A through 3D, alignment feature 312 is a pin that fits into a compatible socket of a mating ferrule. Alignment feature 313 is a socket. A portion 313a of the socket is molded by mold feature 213a and is configured to receive a compatible pin of the mating ferrule. The pin and socket 312, 313 control translation of the optical ferrule 300 along the second lateral axis 122 and may also control rotation of the optical ferrule around the thickness axis 123. Feature 312 may be designed such that only the sides of the pin 312 can come into contact with the mating socket, providing a lateral stop on either side of the pin 312 and thereby controlling translation along the second lateral axis 122. The pin 312 is designed to be slightly narrower that the socket 313 to allow for manufacturing tolerances. Optionally, compliant features (not shown) could be designed into the pin and/or socket to allow for manufacturing tolerances. In some embodiments, the compliant features may provide flexible alignment. The pin or the socket, or both, can be fitted with compliant side features that facilitate centering the pin in the socket.

In some embodiments, the first side of the mold 201 is a single, unitary mold insert configured to mold the first mold features, thereby assuring consistent and accurate alignment of the receiving and securing elements, light affecting elements, and first alignment features in the molded ferrules.

The second mold side 202 includes at least one mold feature 214b configured to mold at least one second alignment feature 314 that, when the ferrule 300 is mated with a mating ferrule, controls translation of the ferrule 300 along the thickness axis 123, rotation of the ferrule 300 around the first lateral axis 121, and rotation of the ferrule 300 around the second lateral axis 122. In the example ferrule 300 shown in FIGS. 3A through 3D, alignment feature 314 is a planar surface that controls three degrees of mechanical freedom of the optical ferrule. When making the ferrule 300, mold sides 201 and 202 are brought together through relative motion of the mold sides 201, 202 along the parting axis 125. Surface 214b is preferably normal to the direction of relative motion of the first and second mold sides (parting axis 125), and being planar, is insensitive to lateral misalignment of the mold sides.

The top and bottom surface 390 of optical ferrule 300 is formed by the first mold side 201 and the second mold side 202. The complete surface 390 can be divided into a first section 391 which is molded by the first mold side 201 and a second section 392 opposite the first section 391 that is molded by the second mold side 202. The first section 391 of the surface 390 of the ferrule 300 includes those features 303, 305, 311, 312, 313 that are molded by mold features 203, 205, 211, 212, 213 of the first side 201 of the mold. The second section 392 of the surface 390 of the ferrule 300 includes the features 314 and 317 that are molded by the mold feature 214b and 217 of the second side 202 of the mold.

Optical ferrules as described herein may have complex shapes including holes that extend through the ferrule, such as socket 313. The surface of an optical ferrule includes the surface portions within the holes, e.g., the surface 390 includes the surface within the socket 313.

The parting lines of the mold are the locations of edges of the mold where the first and second sides of the mold come together. During the molding process, parting line artifacts are formed on the surface of the molded part at locations where the parting lines of the two sides of the mold are in contact with the material being molded. Referring again to FIGS. 2A and 2B, a first parting line occurs where the edge of surface 231a of the first mold side 201 contacts surface 231b of the second mold side 202. This parting line continues where the edge of surface 214a contacts surface 214b. A secondary parting line occurs where the edge of surface 232a of the first side 201 contacts surface 231b of the second side 202. The first parting line extends around a perimeter of the mold, separating the mold halves, and is referred to as the perimeter parting line. A two part mold as shown in FIGS. 2A and 2B has one perimeter parting line and may have one or more secondary parting lines disposed within the perimeter parting line.

The parting line between surfaces 231a and 231b forms a parting line artifact 331 around a perimeter of the optical ferrule 300. A second parting line artifact 332 is formed between the surface 232a of the shut off plug and surface 231b. In this example, the second parting line artifact 332 is disposed within the perimeter parting line artifact 331.

Figure 5A:
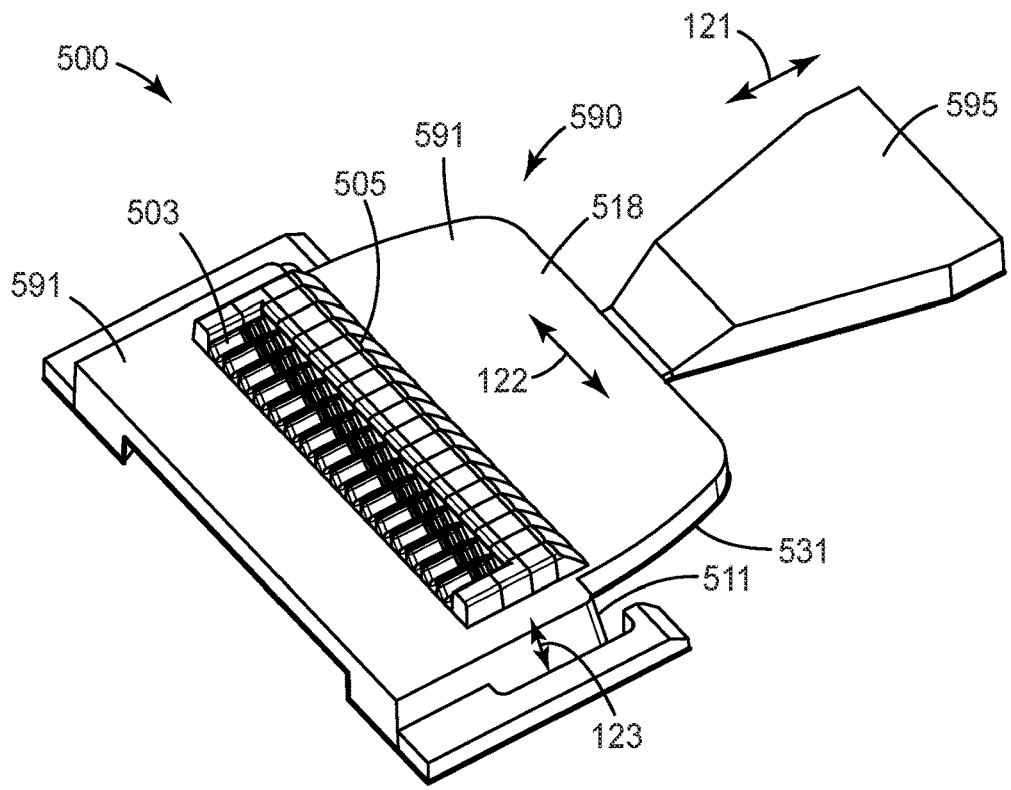
FIGS. 5A through 5D show first and second sides of a unitary optical ferrule made using the mold of FIGS. 4A and 4B.

In an as-molded ferrule, each parting line artifact may be a closed shape, however, subsequent processing or damage to the as-molded ferrule can remove portions of the parting line artifact resulting in gaps in the parting line artifact. For example, the as-molded ferrule 300 shown in FIGS. 3A and 3B and the as-molded ferrule 500 shown in FIGS. 5A and 5B include a runner 395, 595 that provides for the injection of molding material and that is removed in a subsequent processing step after molding. In general, the perimeter parting line artifact encloses the perimeter of the as-molded ferrule 300, 500 except at the injection site, commonly called the gate. Removal of the runner 395, 595 causes a small gap in the perimeter parting line artifact. One or more parting line artifacts, whether closed or open shapes, divide the surface of the ferrule into the first section of the ferrule surface and the second section of the ferrule surface opposite the first section.

Optical ferrules according to various embodiments can include molded features that provide for propagation of light within the ferrule and between the ferrule and a mating ferrule that is aligned with the ferrule. For example, the light affecting elements 305 may comprise lenses or mirrors and may affect one or more of a direction and a divergence of the light propagating in the unitary ferrule 300. In some embodiments, the second side of the mold 202 includes a feature 217 configured to mold an optical output surface 317, wherein the light propagating in the optical ferrule 300 exits the optical ferrule 300 after being transmitted by the optical output surface 317. In some embodiments, the one or more surfaces that form the second alignment feature 314 are coated with an optical antireflection coating.

Figure 3A:
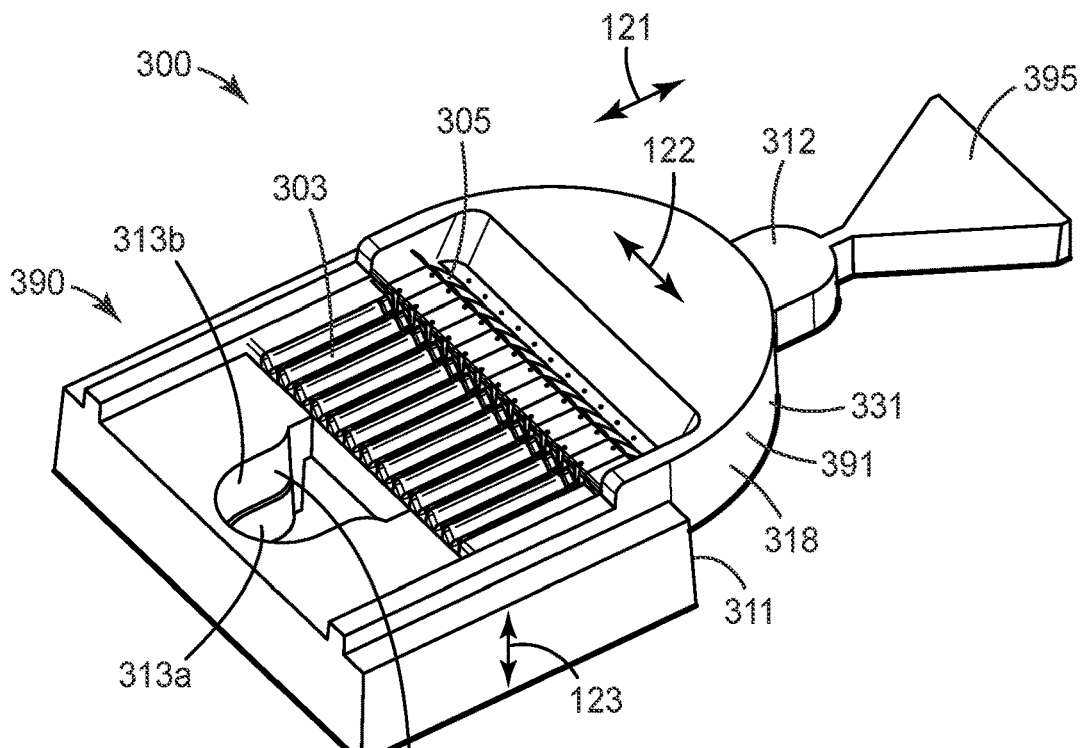
FIGS. 3A through 3D show a unitary optical ferrule made using the mold of FIGS. 2A and 2B.
Figure 3B:
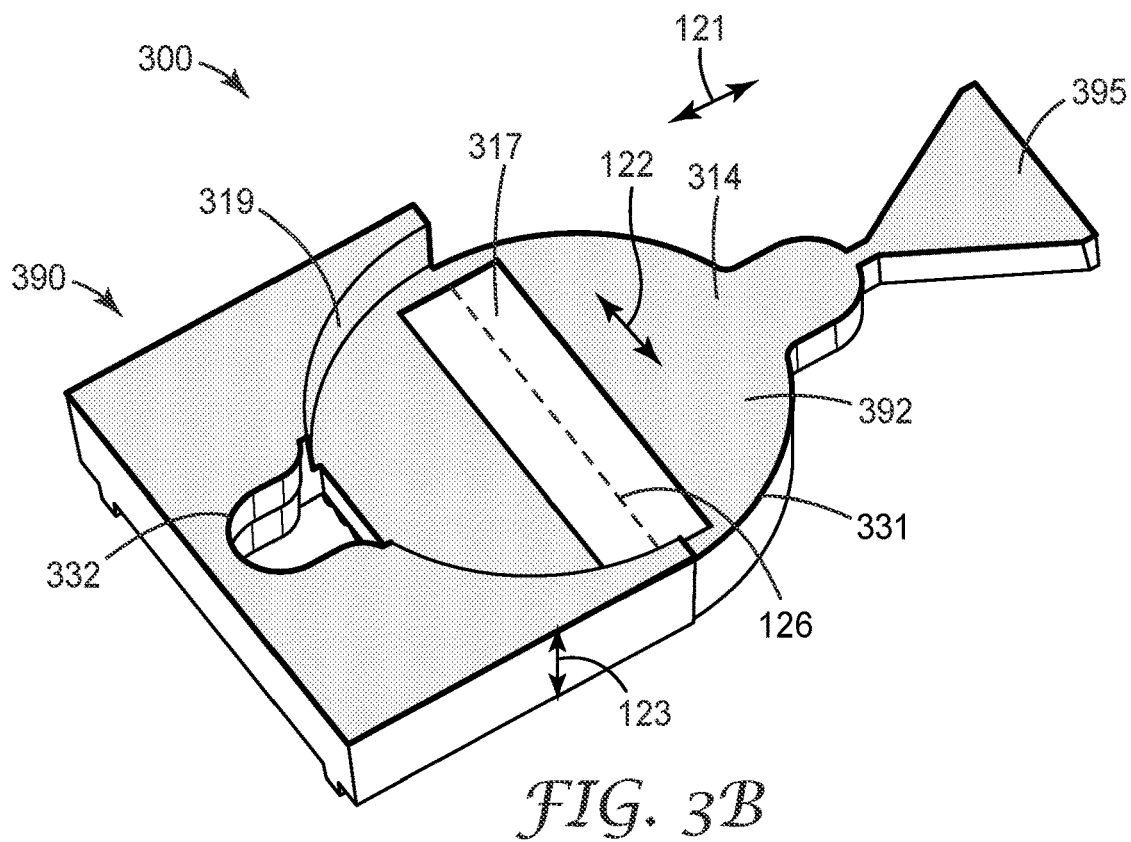
Figure 3C:
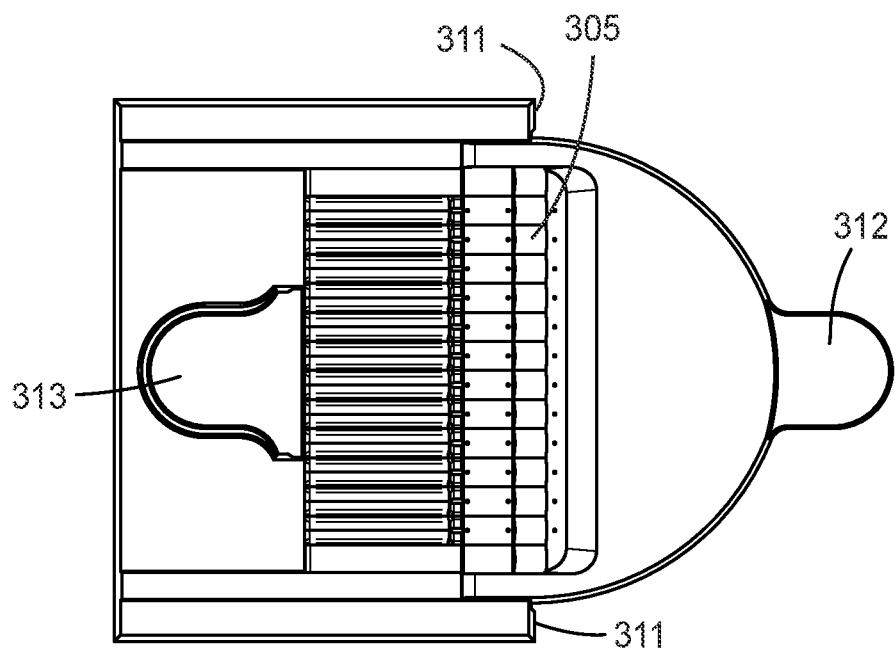
Figure 3D:
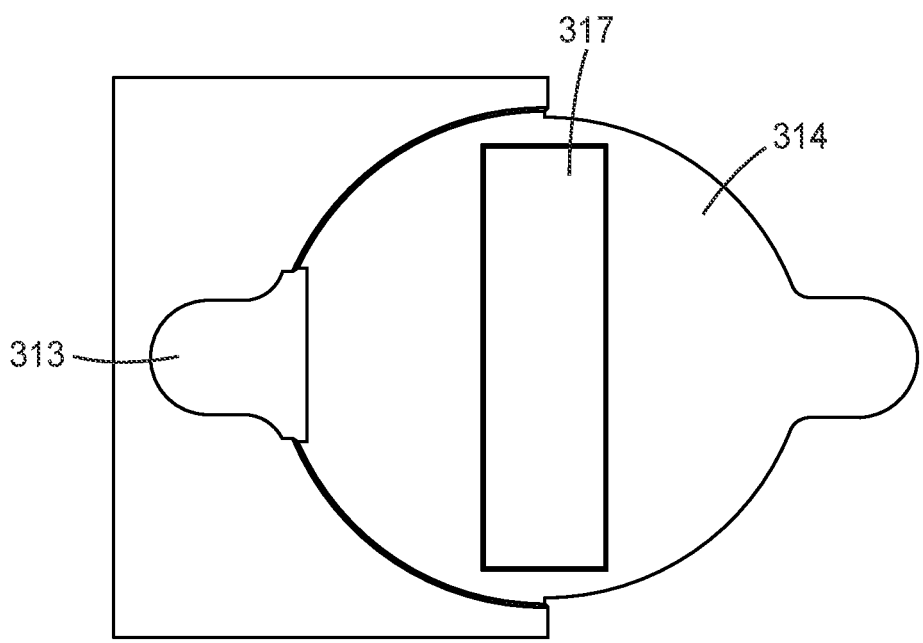
Figure 5B:
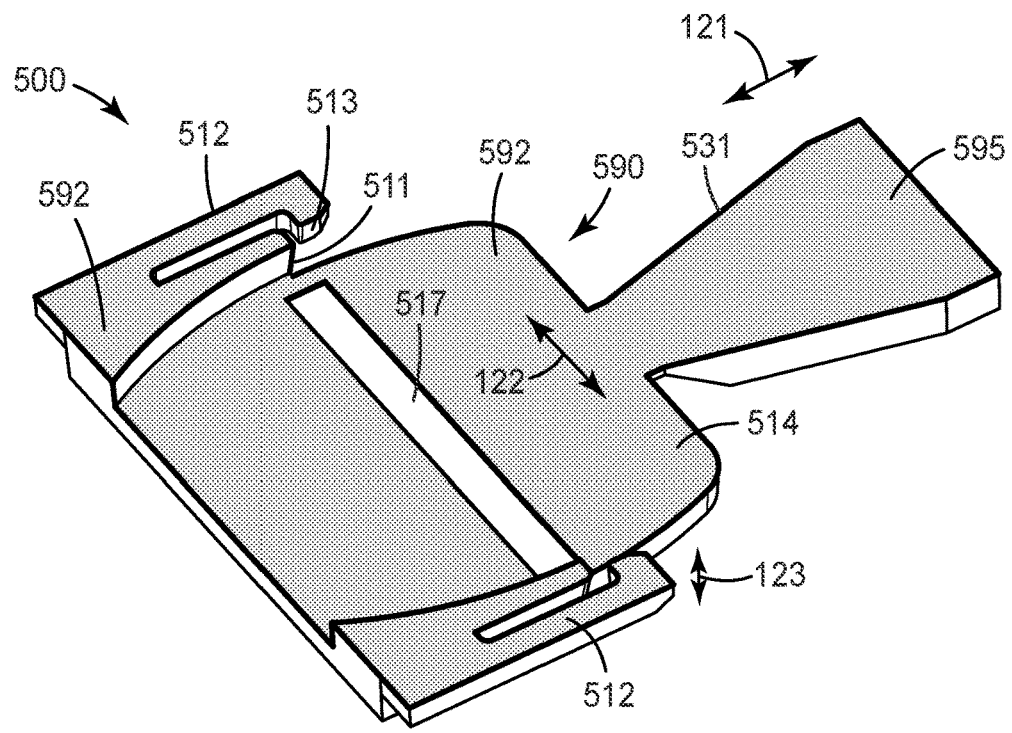
Figure 5C:
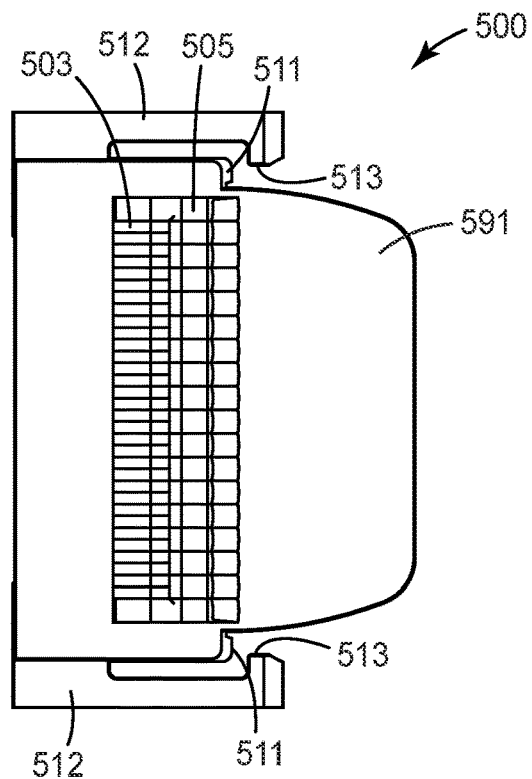
Figure 5D:
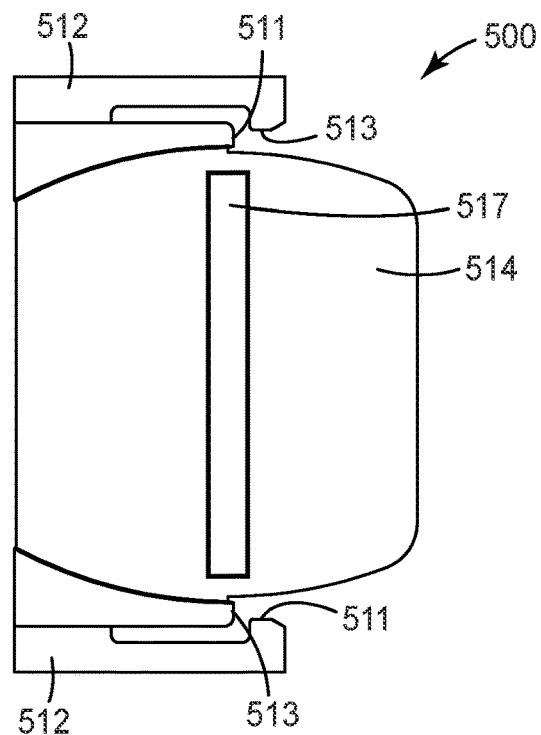
Figure 5E:
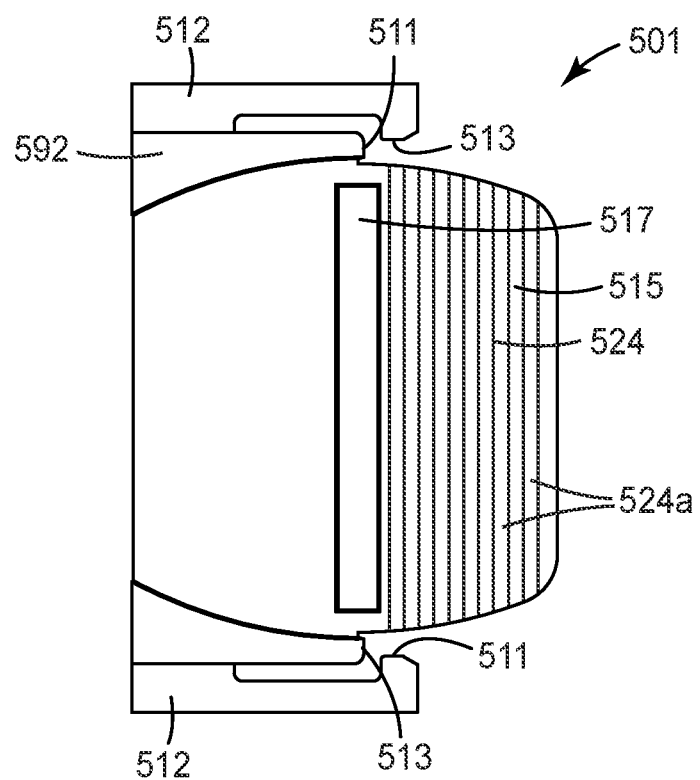
FIG. 5E illustrates the second side of a unitary optical ferrule made using the second mold side shown in FIG. 4C.

The second alignment feature 314 can be a planar surface as shown in FIGS. 3B and 3D or may include multiple planar surface segments 524 as shown in FIG. 5E. However, the second alignment feature need not be planar and may comprise any surface that allows the ferrule 300 to slide relative to and in contact with a compatible mating surface of a mating ferrule.

In hermaphroditic ferrule embodiments illustrated herein, the ferrule and the mating ferrule include both male and female components and are substantially identical. However, it is not necessary for the ferrule and the mating ferrule to be identical or hermaphroditic. For example, in some embodiments the second alignment feature of the ferrule may be a convex surface that is configured to slide against a concave surface of a mating connector.

The first alignment features of the ferrule 300 include a pin 312 disposed at a mating edge of the ferrule 300, e.g., extending from the center of the mating edge, wherein the pin 312 is configured to engage a mating socket of a mating ferrule. In some embodiments, the pin 312 can be configured to control translation of the ferrule along both the first lateral axis 121 and the second lateral axis 122. In other embodiments, a central recess between the mating socket and the pin limits contact between the pin and mating socket to the lateral surfaces of the pin and mating socket. In some embodiments, the central recess provides sufficient clearance between the pin 312 and its mating socket such that the forward stop features 311, rather than pin 312, control translation along the first lateral axis 121. The pin 312 shown in FIGS. 3A through 3D includes a rounded leading edge, however, in some embodiments the pin may be square, tapered, or angled and the socket of the ferrule and a mating ferrule may have a complementary square, tapered, or angled shape.

In some embodiments, the first side of the mold 201 may include a mold feature 218 configured to form a spade portion 318 at a mating end of ferrule 300. The spade 318 may be configured to facilitate mating of the optical ferrule 300 to a mating optical ferrule with sufficient clearance such that the spade 318 does not significantly control mechanical degrees of freedom when the optical ferrule 300 is mated with a mating ferrule. In some embodiments, as shown in FIGS. 3A through 3D, the pin 312 extends from the spade 318. Sufficient clearance can also be provided by mold features 213a, 212 to allow for flash at the edges of features 313a, 312 configured to receive a pin and a socket of a mating ferrule, respectively. In some embodiments, the mating end of the spade may not include a pin (e.g., see FIGS. 5A through 5D).

Figure 4A:
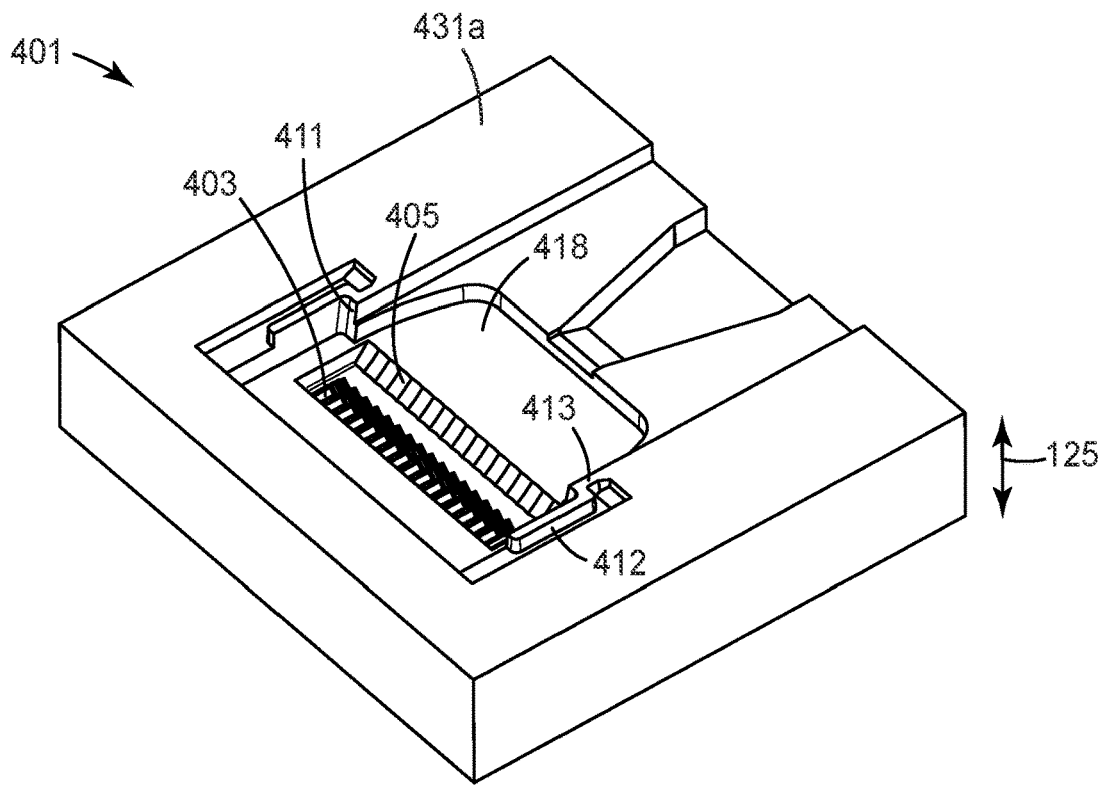
FIGS. 4A and 4B illustrate first and second sides of a mold according to some embodiments.
Figure 4B:
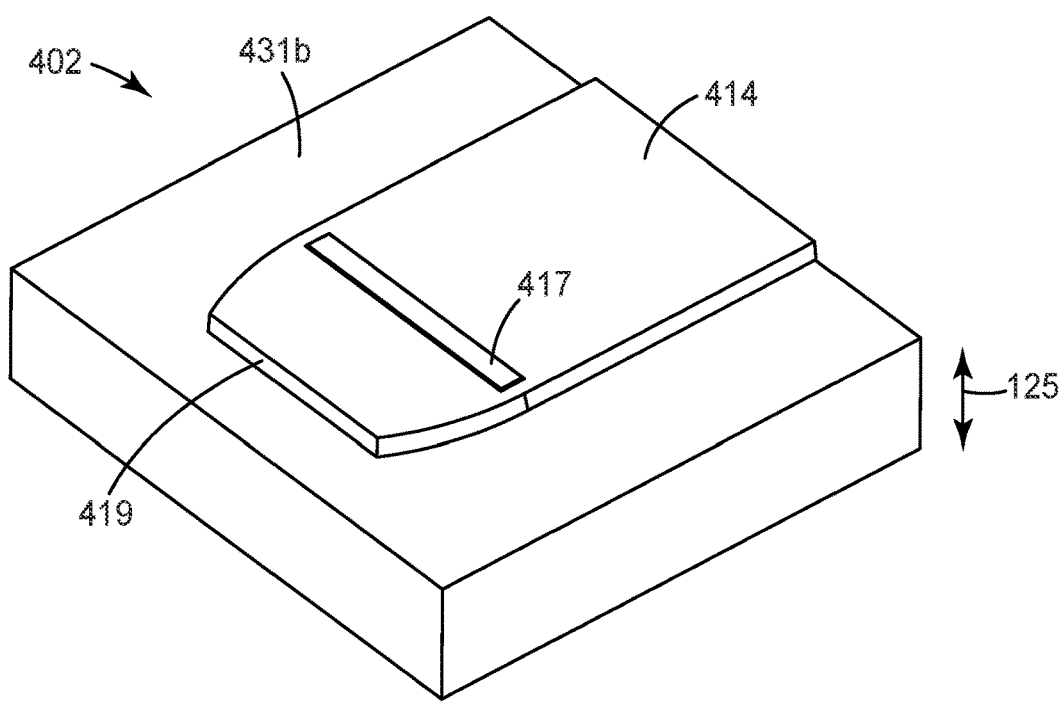

FIGS. 4A and 4B illustrate first and second sides 401, 402 of a mold according to some embodiments. FIGS. 5A through 5D show first and second sides of a unitary optical ferrule 500 made using the mold of FIGS. 4A and 4B. The first mold side 401 includes first mold features 403, 405, 411, 412, 413 and the second mold side 402 includes second mold feature 414. Mold features 403 are configured to mold elements 503, e.g. v-, u-, or y-grooves, of the optical ferrule 500 which receive and secure an optical waveguide. Mold features 405 are configured to mold one or more elements 505 of the optical ferrule 500 that affect characteristics of light from the optical waveguide while propagating the light within the unitary ferrule 500. For example, the light affecting elements 505 may comprise lenses or mirrors and may affect one or more of a direction and a divergence of the light propagating in the unitary ferrule 500. Although optical ferrule 500 includes multiple receiving and securing elements 503 and multiple light affecting elements 505, some unitary optical ferrules can include a single receiving and securing element 503 and a single light affecting element 505.

The first mold side 401 includes mold features 411, 412, 413 configured to mold first alignment features 511, 512, 513 of the unitary ferrule 500. One or more mold features 411 are configured to mold one or more alignment features 511 in the ferrule 500 that, when the ferrule 500 is mated with a mating ferrule (not shown), control translation of the ferrule 500 along a first lateral axis 121. In the embodiment shown in FIGS. 5A through 5D, the features 511 comprise forward stops that, when engaged with forward stops of a mating ferrule, restrict further forward motion along the first lateral axis 121. The forward stops 511 also control rotation of the ferrule 500 around the thickness axis 123.

One or more mold features 412, 413 are configured to mold one or more alignment features 512, 513 in the ferrule 500 that control translation of the ferrule 500 along the second lateral axis 122. In the embodiment of FIGS. 5A through 5D, the optical ferrule 500 includes side arms 512 having contact elements 513. After the ferrule 500 mates with a mating ferrule, the contact elements 513 of each arm 512 make contact with a side of the mating ferrule. Flexibility in the arms 512 can allow for substantial manufacturing tolerances. When mated with a mating ferrule, the contact elements 513 and side arms 512 control translation of the optical ferrule along the second lateral axis 122 and may also control rotation of the optical ferrule 500 around the thickness axis 123. Side arms 512 are flexible, thus the side arms 512 and lateral stops 513 limit movement along the second lateral axis 122 but allow some lateral movement of the ferrule. Flexible side arms 512 facilitate alignment of the light affecting elements 505 of the ferrule 500 and the light affecting elements of the mating ferrule. In this example, in equilibrium, the forces created by the flexing of the four arms of the ferrule 500 and the mating ferrule balance to align the ferrules relative to each other. In some embodiments, the ends of the arms provide forward stops that control translation along the first lateral axis 121.

The material forming the compliant features and/or the geometry of the compliant features can be selected to provide a desired alignment force between ferrules. For example, the alignment force provided by the compliant features can be increased or decreased by choosing a material for the compliant features with a higher or lower Young's modulus, respectively. As another example, in embodiments utilizing flexible arms, the alignment force provided by the flexible arms can be increased or decreased by choosing larger or smaller cross-sectional areas, respectively, for the flexible arms. Useful alignment forces can be obtained by choosing an injection moldable polymer for both a body of the ferrule and the compliant features of the ferrule and by choosing a geometry of the compliant features that can be injection molded along with the body of the ferrule. In this way, for example, a unitary ferrule having compliant features that provide a desired alignment force can be made in an injection molding process. Additional details regarding flexible alignment features are provided in commonly owned and concurrently filed U.S. Patent Application Ser. 62/240,066, having the title "Ferrules, Alignment Frames and Connectors," which is incorporated herein by reference.

The second mold side 402 includes at least one mold feature 414 configured to mold at least one second alignment feature 514 that, when the ferrule 500 is mated with a mating ferrule, controls translation of the ferrule 500 along the thickness axis 123, rotation of the ferrule 500 around the first lateral axis 121, and rotation of the ferrule 300 around the second lateral axis 122. As shown in FIG. 5A through 5D, the second alignment feature may comprise a planar surface. When making the ferrule 500, mold sides 401 and 402 are brought together along the parting axis 125. Surface 414 is preferably normal to the direction of the relative motion of the mold sides (parting axis 125), making it insensitive to misalignment of the mold sides. Mold feature 417 is configured to form an optical window 517, e.g., a recessed optical window, in the planar surface 514. Optical window 517 may be coated with an antireflective coating.

The optical ferrule 500 has a surface 590 that is formed by the first mold side 401 and the second mold side 402. The surface 590 can be divided into a first section 591 that includes features 503, 505, 511, 512, 513 which are formed by the first mold side 401 and a second section 592 that includes features 514 that is formed by the second mold side 402.

Referring again to FIGS. 4A-4B, a parting line occurs where the edge of surface 431a of the first mold side 401 contacts surface 431b of the second mold side 402. The parting line extends around a perimeter of the mold, separating the mold sides.

The parting line between surfaces 431a and 431b forms parting line artifact 531 that extends around a perimeter of the as-molded optical ferrule 500. The parting line artifact 531 divides the surface 590 of the ferrule 500 into the first section 591 and the second section 592 opposite the first section 591. The first section 591 includes the receiving and securing elements 503, the light affecting elements 505, and one or more first alignment features 511, 512, 513. After the ferrule 500 is mated with a mating ferrule, the first alignment features 511, 512, 513 control translation of the ferrule along the first lateral axis 121, translation of the ferrule along the second lateral axis 122, and rotation of the ferrule 500 around the thickness axis 123.

The second section 592 of the surface 590 of the optical ferrule 500 includes at least one second alignment feature 514. After the ferrule 500 is mated with a mating ferrule, the second alignment feature 514, which may be a planar surface as shown in FIG. 5B, controls translation of the ferrule along the thickness axis 123, rotation of the ferrule 500 around the first lateral axis 121, and rotation of the ferrule 500 around the second lateral axis 122. Mold feature 417 is configured to form an optical window 517, e.g., a recessed optical window, in the planar surface 514.

In some embodiments, a mold feature 418 is configured to mold a spade 518 of the optical ferrule 500. The spade 518 may be configured to facilitate mating of the optical ferrule 500 to a mating optical ferrule with sufficient clearance such that the spade 518 does not significantly control mechanical degrees of freedom when the optical ferrule 500 is mated with a mating ferrule. Sufficient clearance can be provided by features 419 in the second side 402 of the mold for the spade of a mating ferrule, allowing for flash at the edges of the spade.

Figure 4C:
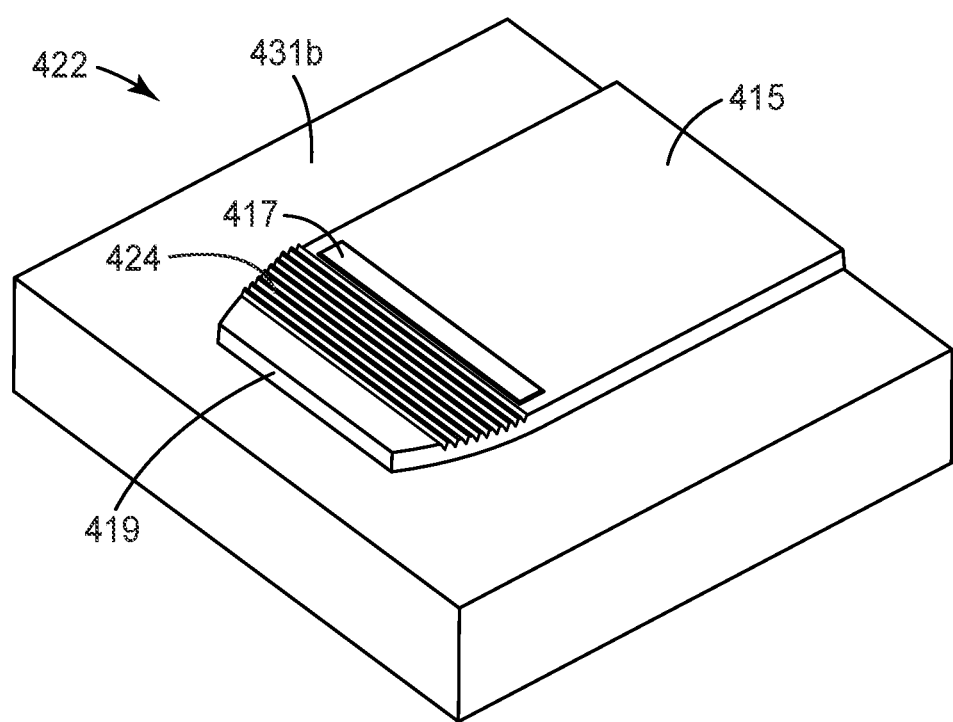
FIG. 4C shows a second mold side that includes mold features configured to mold multiple planar surfaces in accordance with some embodiments

An alternative to a planar surface 314, 514 illustrated in FIGS. 3B and 5B is the use channels, bumps and/or rails that provide multiple planar surfaces that mate against a similar surface or a single planar surface of a mating ferrule. The multiple planar surfaces may be multiple co-planar surfaces or multiple parallel surfaces. The total surface area of the planar surface regions is large enough to accommodate any mating forces between ferrules. FIG. 4C illustrates the second side 422 of a mold having a surface 415 that includes mold features 424 configured to mold a surface 515 with multiple channels 524 of the optical ferrule 501 as shown in FIG. 5E. The lands of the channels provide multiple planar surfaces 524a. In various embodiments, the channels 524 may be disposed on one side or both sides of the optical output window 517. The channels 524 may be substantially parallel to the edges of the optical output window 517 and/or may be disposed at an angle to the optical output window 517. The flush mating of the planar surfaces 524a with a mating ferrule determines three degrees of freedom: translation along the thickness axis 123, rotation around the first lateral axis 121, and rotation around the second lateral axis 122. The three remaining degrees of freedom: translation along the first lateral axis 121, translation along the second lateral axis 122, and rotation around the thickness axis 123 are all determined by mating features in the first side of the mold, which also contains the features for molding the optical elements.

Figure 6A:
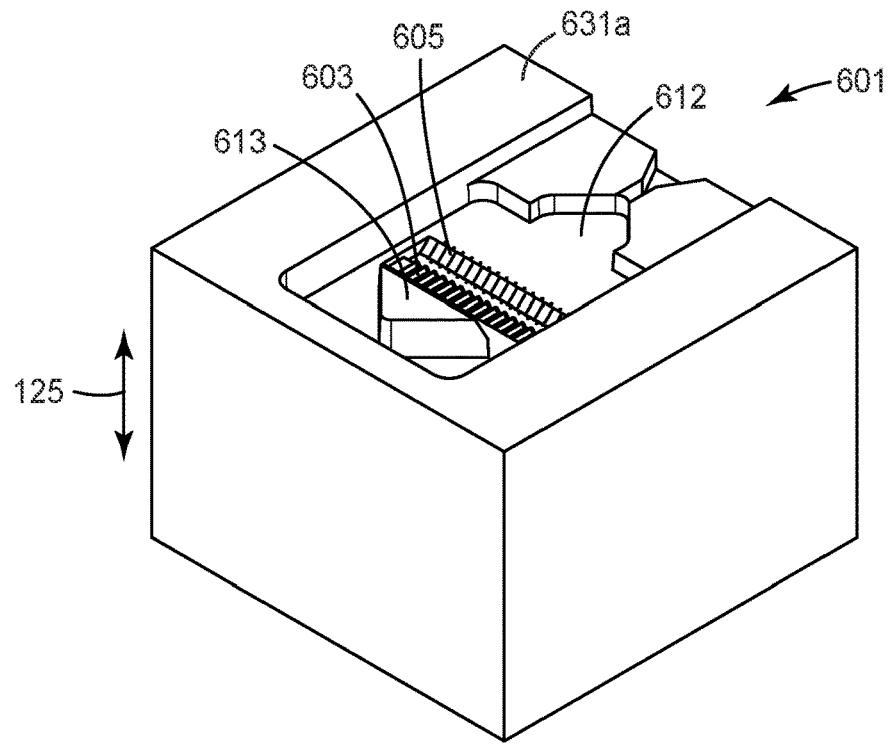
FIGS. 6A and 6B illustrate first and second sides of a mold according to some embodiments.
Figure 6B:
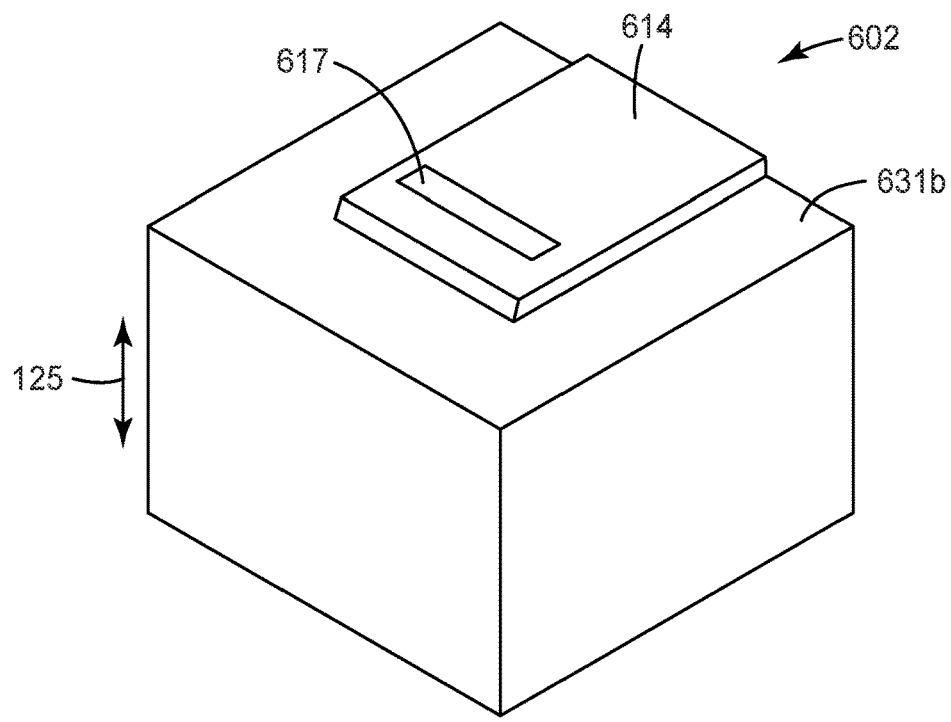
Figure 7A:
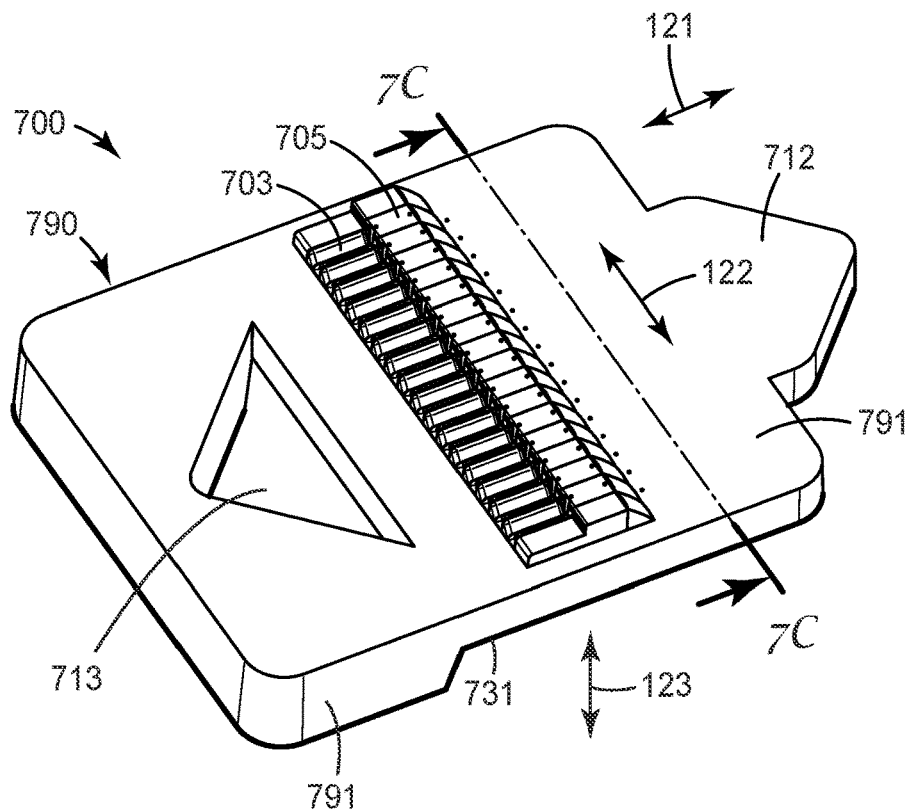
FIGS. 7A and 7B show first and second sides of a unitary optical ferrule made using the mold of FIGS. 6A and 6B.
Figure 7B:
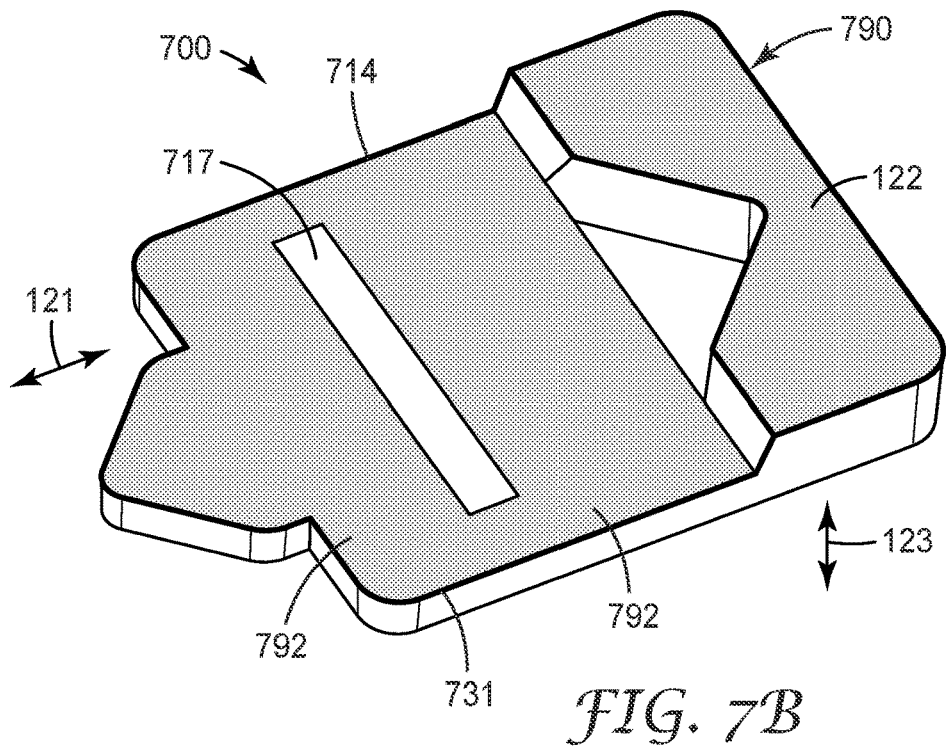

FIGS. 6A and 6B illustrate first and second sides 601, 602 of a mold according to some embodiments. FIGS. 7A and 7B show first and second sides of a unitary optical ferrule 700 made using the mold of FIGS. 6A and 6B. The first mold side 601 includes first mold features 603, 605, 612 and the second mold side 602 includes second mold feature 614. Mold features 603 are configured to mold elements 703, e.g. grooves, of the optical ferrule 700 which receive and secure an optical waveguide. Mold features 605 are configured to mold one or more elements 705 of the optical ferrule 700 that affect characteristics of light from the optical waveguide while propagating the light within the unitary ferrule 700. For example, the light affecting elements 705 may comprise lenses or mirrors and/or may affect one or more of a direction and a divergence of the light propagating in the unitary ferrule 700. Although optical ferrule 700 includes multiple receiving and securing elements 703 and multiple light affecting elements 705, some unitary optical ferrules can include a single receiving and securing element and a single light affecting element.

The first mold side 601 includes mold features 612, 613 that are configured to mold first alignment features 712, 713 of the unitary optical ferrule 700. When the ferrule 700 is mated with a mating ferrule (not shown), the first alignment features 712, 713 control translation of the ferrule 700 along the first lateral axis 121, translation of the ferrule along the second lateral axis 122, and rotation of the ferrule 700 around the thickness axis 123. Alignment features 712, 713 in the ferrule 700 comprise a pointed pin 712 and a pointed socked 713. Pin 712 is configured to fit into a compatible socket of a mating ferrule, e.g. a socket similar in shape to socket 713. Socket 713 is configured to receive a compatible pin of a mating ferrule, e.g. a pin similar in shape to pin 712.

The second mold side 602 includes at least one mold feature 614 configured to mold a second alignment feature 714 that, when the ferrule 700 is mated with a mating ferrule, controls translation of the ferrule 700 along the thickness axis 123, rotation of the ferrule 700 around the first lateral axis 121, and rotation of the ferrule 700 around the second lateral axis 122. As shown in FIG. 7B, the second alignment feature 714 may comprise a planar surface. When making the ferrule 700, mold sides 601 and 602 are brought together along the parting axis 125. Surface 614 is preferably normal to the direction of the relative motion of the mold sides, making it insensitive to misalignment of the mold sides. Mold feature 617 is configured to form an optical window 717, e.g., a recessed optical window, in the planar surface 714. Optical window 717 may be coated with an antireflective coating.

The optical ferrule 700 has a surface 790 that is formed by the first mold side 601 and the second mold side 602. The surface 790 can be divided into a first section 791 that includes features 703, 705, 712, 713 which are formed by the first mold side 601 and a second section 792 that includes feature 714 that is formed by the second mold side 602.

Referring again to FIGS. 6A and 6B, a parting line occurs where the edge of surface 631a of the first mold side 601 contacts surface 631b of the second mold side 602. The parting line where the edge of surface 631a of the first mold side 601 contacts surface 631b of the second mold side 602 extends around a perimeter of the mold, separating the mold halves.

Figure 7C:
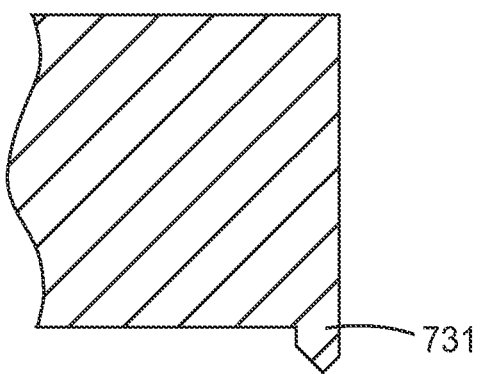
FIG. 7C is a view of a perimeter parting line artifact of the optical ferrule of FIGS. 7A and 7B.

Referring now to FIGS. 6A and 6B and FIGS. 7A and 7B, the parting line between surfaces 631a and 631b forms parting line artifact 731, shown in more detail in inset FIG. 7C, that extends substantially around a perimeter of the optical ferrule 700. The parting line artifact 731 divides the surface 790 of the ferrule 700 into a first section 791 and the second section 792 opposite the first section 791. The first section 791 includes the receiving and securing elements, 703, the light affecting elements 705, and one or more first alignment features 712, 713. After the optical ferrule is mated with a mating optical ferrule, the first alignment features 712, 713 control three degrees of mechanical freedom—translation of the optical ferrule along the first lateral axis 121, translation of the optical ferrule along the second lateral axis 122, and rotation of the optical ferrule around the thickness axis 123.

The second section 792 of the surface 790 of the optical ferrule 700 includes at least one second alignment feature 714. After the ferrule 700 is mated with a mating ferrule, the second alignment feature 714, which may be a planar surface as shown in FIG. 7B, controls three degrees of mechanical freedom: translation of the ferrule 700 along the thickness axis 123, rotation of the ferrule 700 around the first lateral axis 121, and rotation of the ferrule 500 around the second lateral axis 122.

In the examples provided above, when the ferrule is mated with a mating ferrule, the bottom surfaces of the ferrules (features 314 of FIG. 3B, 514 of FIG. 5B, 515 of FIG. 5E, and 714 of FIG. 7B) slide and are pressed against each other ensuring that the ferrule 300, 500, 501, 700 and the mating ferrule are parallel and determining the distance along the thickness axis 123 between the receiving and securing elements 303, 503, 703 (e.g., v-grooves) and the light affecting elements 305, 505, 705 (e.g., mirror lenses) of the ferrule 300, 500, 501, 700 and the mating ferrule. Because the surface (or multiple surfaces) 314, 514, 515, 714 is/are formed normal to the axis 125 of relative motion of the two sides of the mold, it has no critical dependence on the alignment of the first and second sides of the mold along the first lateral axis 121 and the second lateral axis 122. As previously discussed, surface 314, 514, 515, 714 may include an optical window where the light beams exit the ferrule. The window is made large enough to accommodate any misalignment in the first and second sides of the mold.

As illustrated by FIGS. 8A-10, in some embodiments, the mold may include features configured to form multiple parallel planar surfaces on the second section of the optical ferrule. During mating, each planar surface provides a sliding surface that slides on a mating surface of a mating ferrule. When mated, the multiple planar surfaces control translation of the optical ferrule along the thickness axis 123, rotation around the first lateral axis 121, and rotation around the second lateral axis 122. In some embodiments, one or more of the planar surfaces may be textured. In some embodiments, the sliding surface may include grooves wherein multiple coplanar surfaces are formed by the lands between the grooves.

Figure 8A:
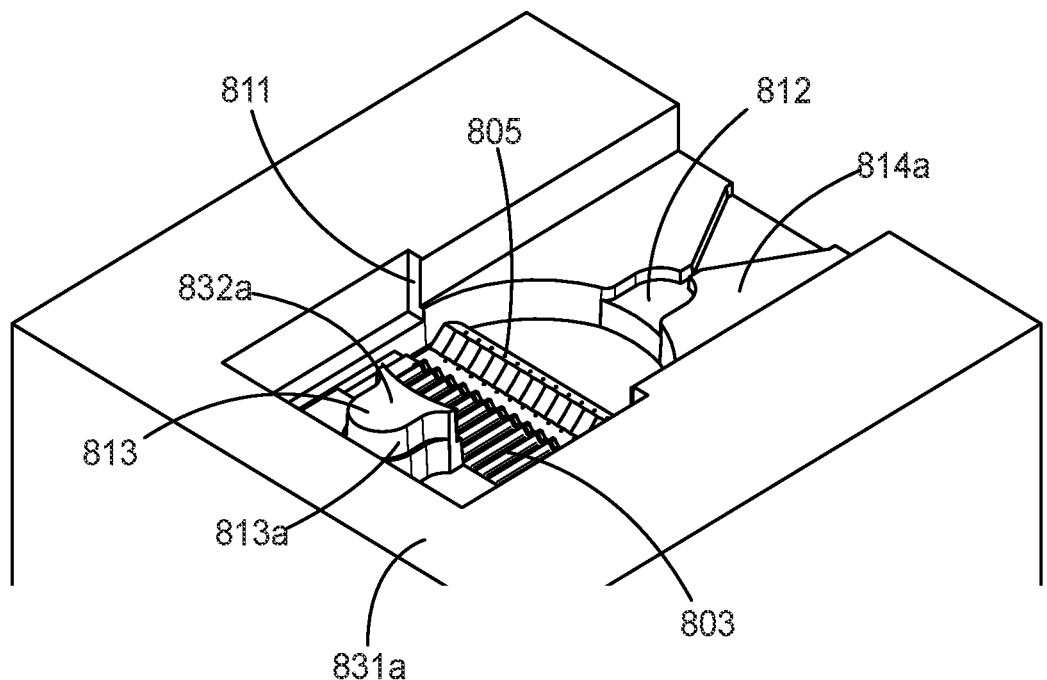
FIGS. 8A and 8B illustrate first and second sides of a mold according to some embodiments.
Figure 8B:
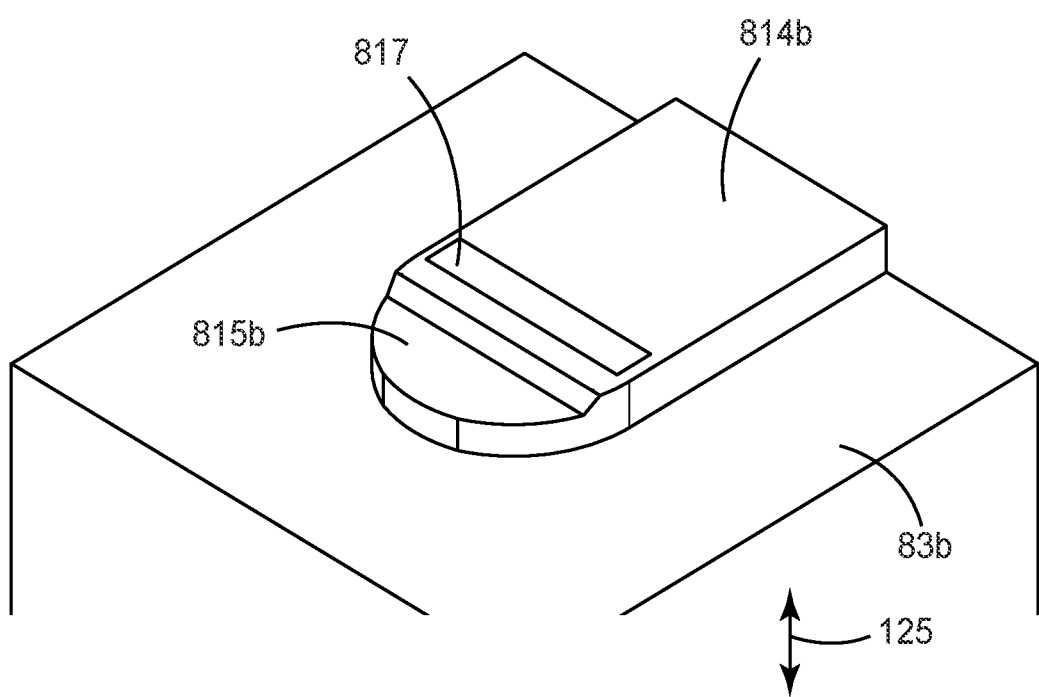
Figure 9A:
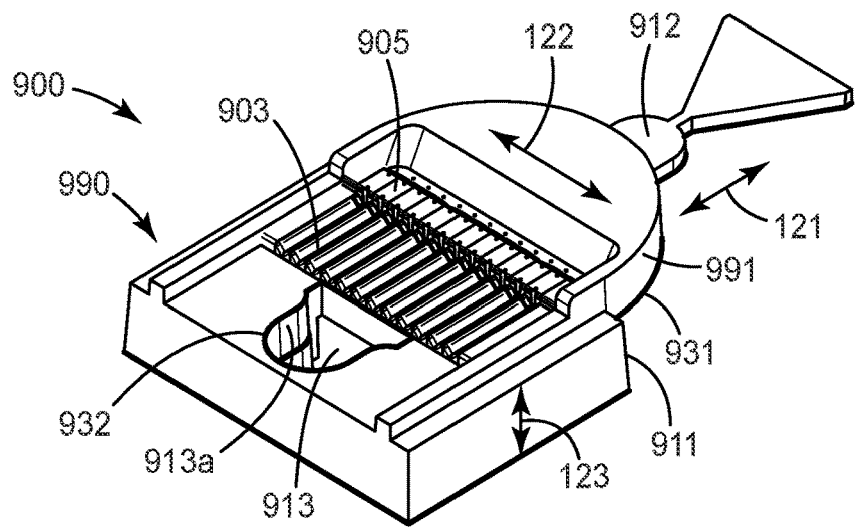
FIGS. 9A and 9B show a unitary optical ferrule made using the mold of FIGS. 8A and 8B.
Figure 9B:
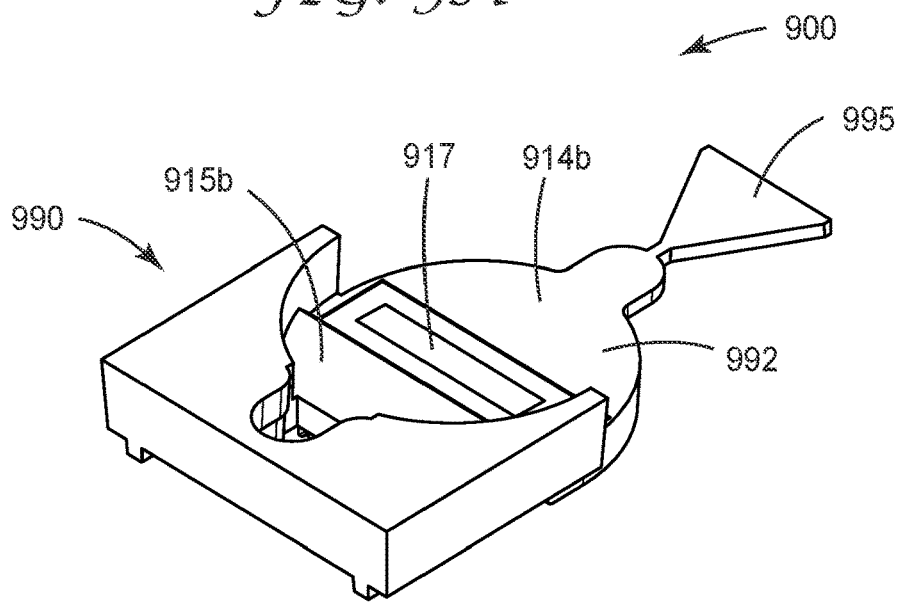

FIGS. 8A and 8B illustrate first and second sides 801, 802 respectively, of a mold, according to some embodiments. FIGS. 9A and 9B show a unitary optical ferrule 900 made using the mold of FIGS. 8A and 8B. The first mold side 801 includes first mold features 803, 805, 811, 812, 813 and the second mold side 802 includes second mold features 814, 815b and 817. Mold features 803 of mold side 801 are configured to mold one or more elements 903, e.g., grooves, of the optical ferrule 900 configured for receiving and securing an optical waveguide. Mold features 805 of mold side 801 are configured to mold one or more elements 905 of the optical ferrule 900 configured for affecting characteristics of light from the optical waveguide while propagating the light within the optical ferrule 900. Although optical ferrule 900 includes multiple receiving and securing elements 903 and multiple light affecting elements 905, some unitary optical ferrules can include a single receiving and securing element 903 and a single light affecting element 905.

The first mold side 801 includes mold features 811, 812, 813 configured to mold one or more first alignment features 911, 912, 913. When mated with a mating optical ferrule (not shown), alignment features 911 of the optical ferrule 900 control translation of the ferrule 900 along a first lateral axis 121, e.g., the first lateral axis. Features 911 shown in the example optical ferrule 900 of in FIGS. 9A and 9B are forward stops that engage with forward stops of a mating ferrule to set the mated distance between light affecting elements of the optical ferrule and light affecting elements of the mating ferrule. The forward stops 911, when engaged with forward stops of the mating ferrule, also control rotation of the optical ferrule 900 around the thickness axis 123. The forward stops 911 are formed by the first side 801 of the mold.

Mold features 812, 813 are configured to mold alignment features 912, 913 in the optical ferrule 900. In the example ferrule shown in FIGS. 9A and 9B, alignment feature 912 is a pin that fits into a compatible socket of a mating ferrule. Alignment feature 913 is a socket. A portion 913a of the socket is molded by mold feature 813a and is configured to receive a compatible pin of the mating ferrule. The pin and socket 912, 913 control translation of the optical ferrule 900 along the second lateral axis 122 and may also control rotation of the optical ferrule around the thickness axis 123. Feature 912 may be designed such that only the sides of the pin 912 can come into contact with the mating socket, providing a lateral stop on either side of the pin 912 and thereby controlling translation along the second lateral axis 122. The pin 912 is designed to be slightly narrower that the socket 913 to allow for manufacturing tolerances. Optionally, compliant features (not shown) could be designed into the pin and/or socket to allow for manufacturing tolerances. In such cases, the pin or the socket, or both, can be fitted with compliant (e.g. elastic) side features that center the pin in the socket.

The second mold side 802 includes mold features 814b and 815b configured to mold parallel planar surfaces 914b and 915b as second alignment features. When the ferrule 900 is mated with a mating ferrule, the second alignment features 914a, 914b control translation of the ferrule 900 along the thickness axis 123, rotation of the ferrule 900 around the first lateral axis 121, and rotation of the ferrule 900 around the second lateral axis 122. In the example ferrule 900 shown in FIGS. 9A and 9B, alignment features 914b and 915b are parallel planar surfaces that, when the optical ferrule 900 is mated with a mating ferrule, control three degrees of mechanical freedom of the optical ferrule 900. When making the ferrule 900, mold sides 801 and 802 are brought together through relative motion of the mold sides 801, 802 along the parting axis 125. Surfaces 814a, 814b, and 815b are preferably normal to the direction of relative motion of the first and second mold sides (along parting axis 125), and being planar, are insensitive to lateral misalignment of the mold sides.

The surface 990 of optical ferrule 900 is formed by the first mold side 801 and the second mold side 802. The complete surface 990 can be divided into a first section 991 which is molded by the first mold side 801 and a second section 992 opposite the first section 991 that is molded by the second mold side 802. The first section 991 of the surface 990 of the ferrule 900 includes those features 903, 905, 911, 912, 913 that are molded by mold features 803, 805, 811, 812, 813 of the first side 801 of the mold. The second section 992 of the surface 990 of the ferrule 900 includes the parallel planar surfaces 914b, 915b and optical output window 917 that are molded by the mold features 814b, 815b, and 817 of the second side 802 of the mold.

A first parting line occurs where the edge of surface 831a of the first mold side 801 contacts surface 831b of the second mold side 802. This parting line continues where the edge of surface 814a contacts surface 814b. A secondary parting line occurs where the edge of surface 832a of the first side 801 contacts surface 831b of the second side 802. The first parting line extends around a perimeter of the mold, separating the mold halves, and is referred to as the perimeter parting line. A two part mold as shown in FIGS. 8A and 8B has one perimeter parting line and may have one or more secondary parting lines disposed within the perimeter parting line.

The parting line between surfaces 831a and 831b forms a parting line artifact 931 around a perimeter of the optical ferrule 900. A second parting line artifact 932 is formed between the surface 832a of the shut off plug 813 and surface 831b. In this example, the second parting line artifact 932 is disposed within the perimeter parting line artifact 931.

Figure 10:
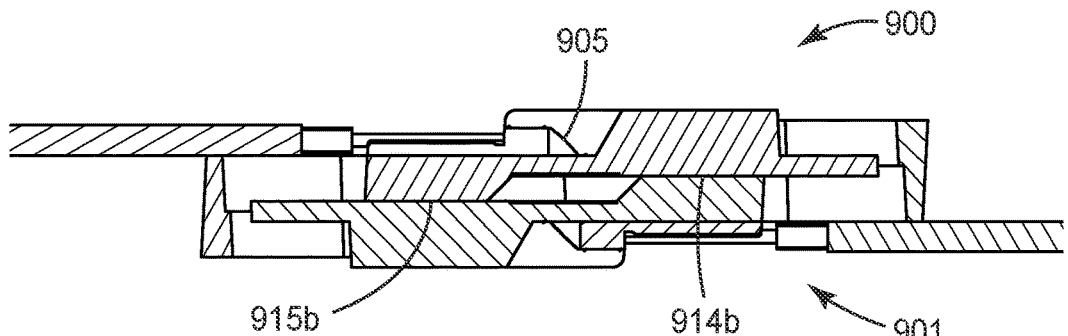
FIG. 10 depicts mated unitary optical ferrules having multiple parallel planar surfaces in accordance with some embodiments.

The as-molded ferrule 900 shown in FIGS. 9A and 9B includes a runner 995 that provides for the injection of molding material and that is removed in a subsequent processing step after molding. FIG. 10 provides a cross sectional view of the ferrule 900 mated with a mating ferrule 901.

In some embodiments, as illustrated by FIGS. 11 through 12, but also applicable to other molds and ferrules described herein, mold features provide reference planes from which the angular relationships between various surfaces of a ferrule created using the mold can be determined.

Figure 11A:
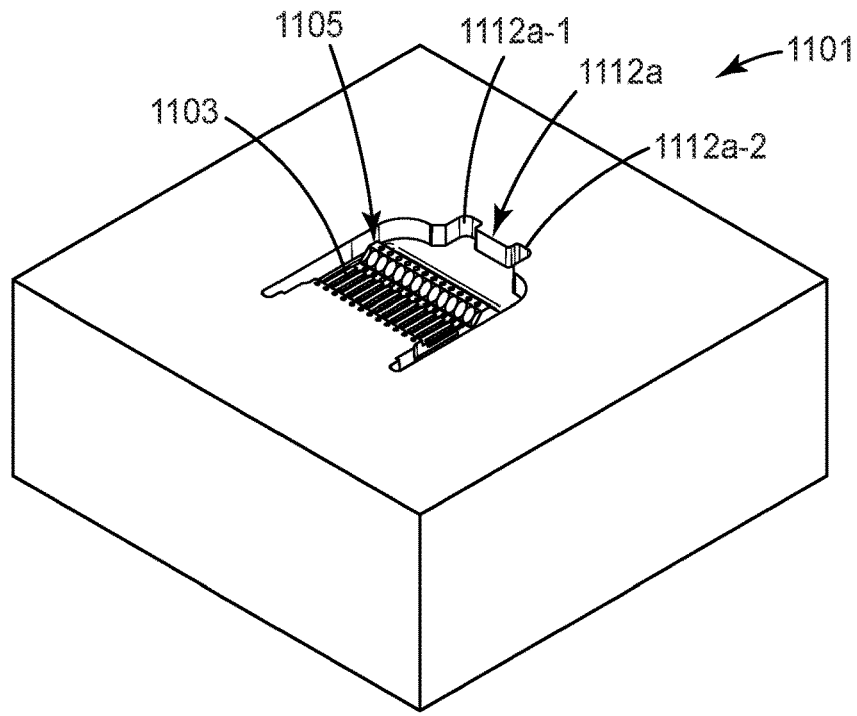
FIGS. 11A through 11C illustrate first and second sides of a mold according to some embodiments.
Figure 11B:
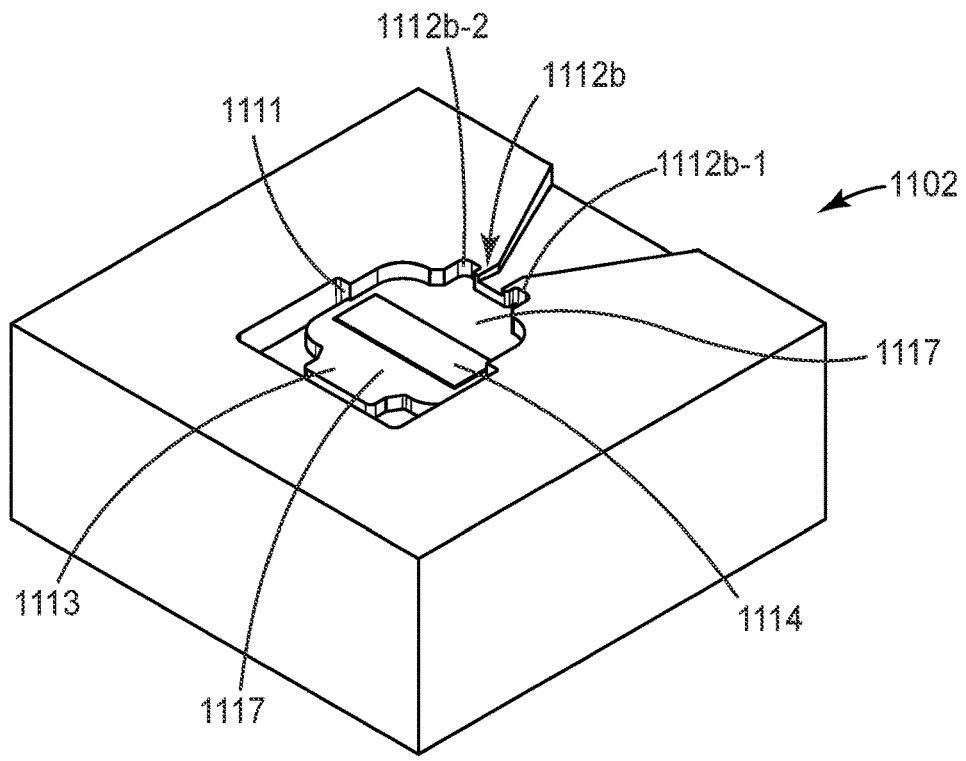
Figure 11C:
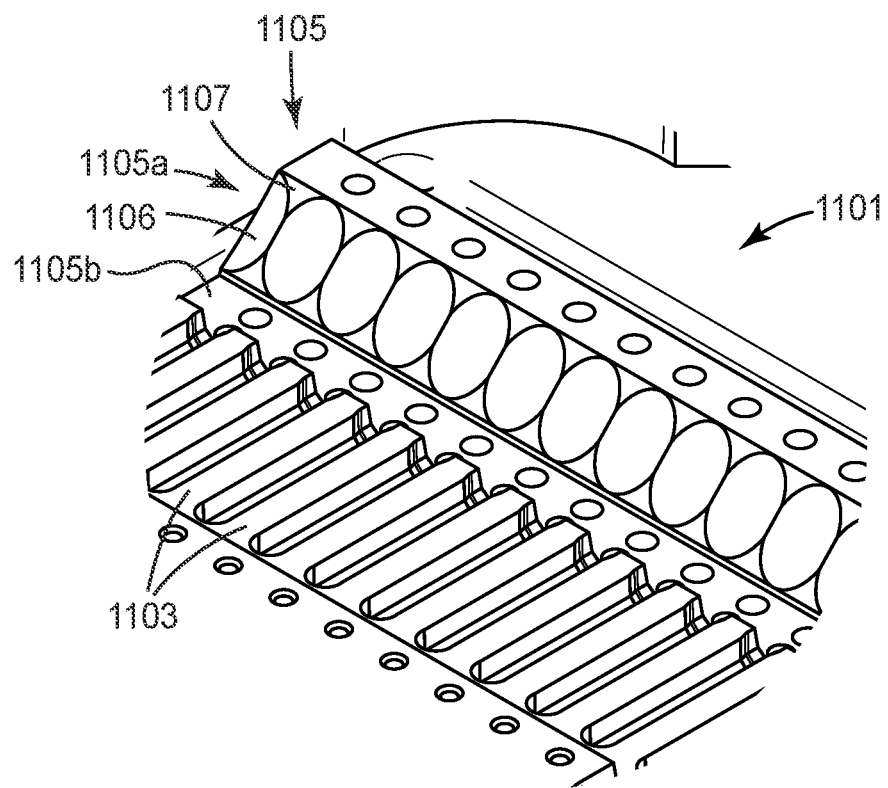
Figure 12A:
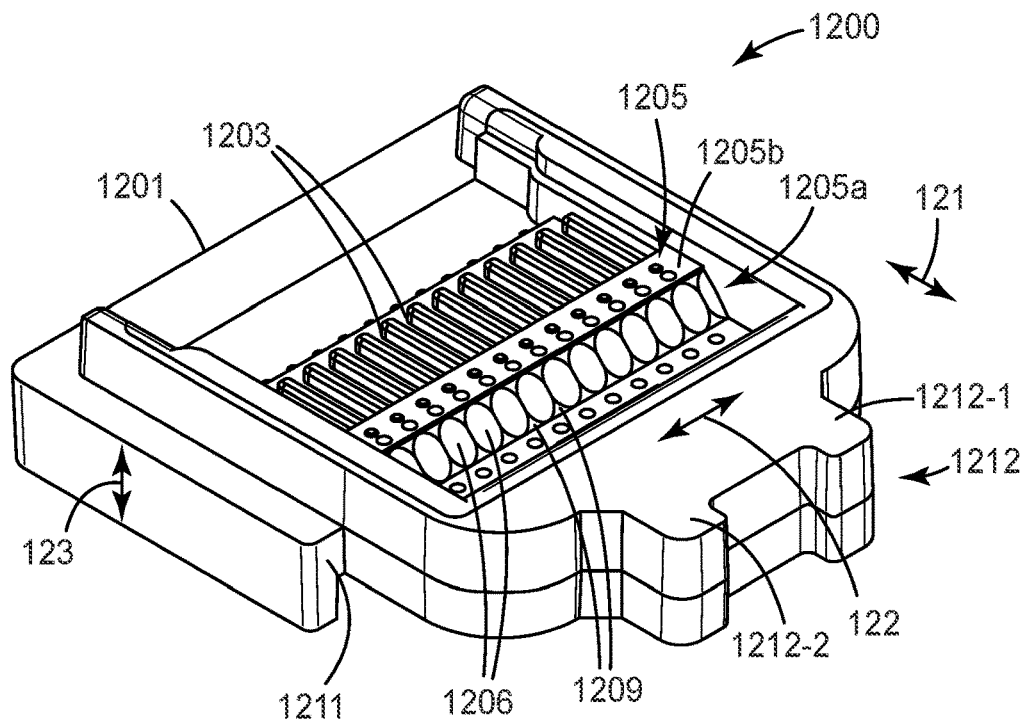
FIGS. 12A through 12E show a unitary optical ferrule made using the mold of FIGS. 11A through 11C.
Figure 12B:
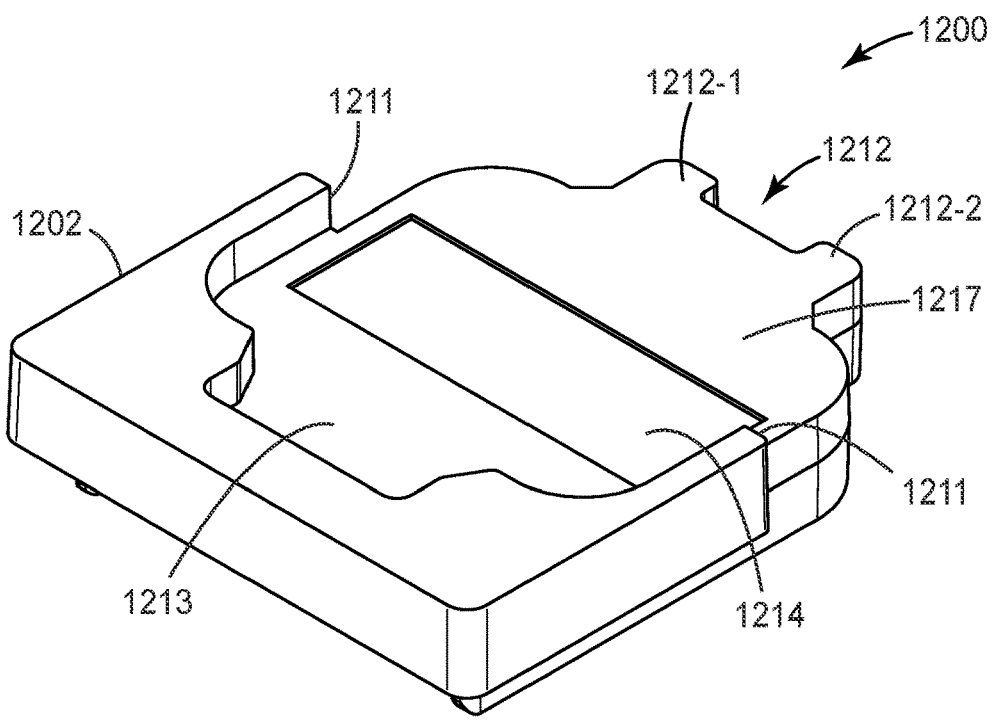
Figure 12C:
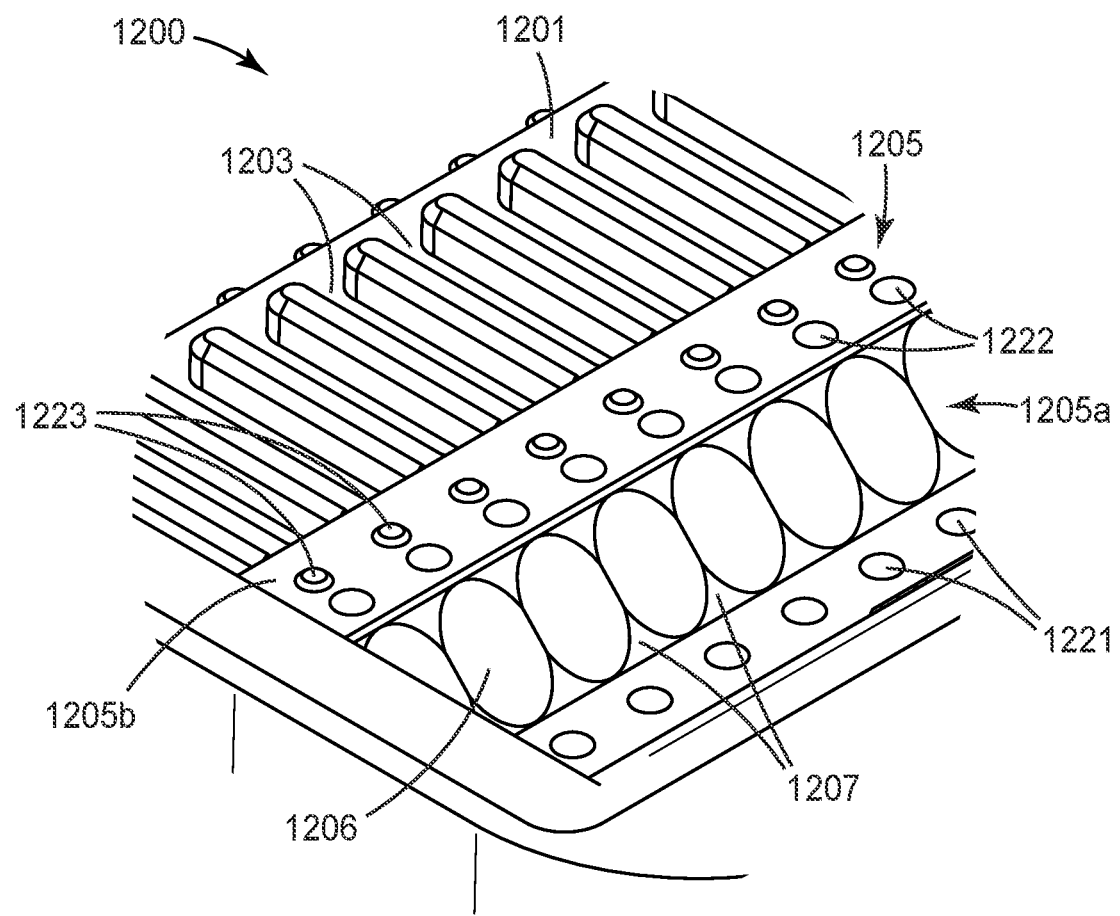
Figure 12D:
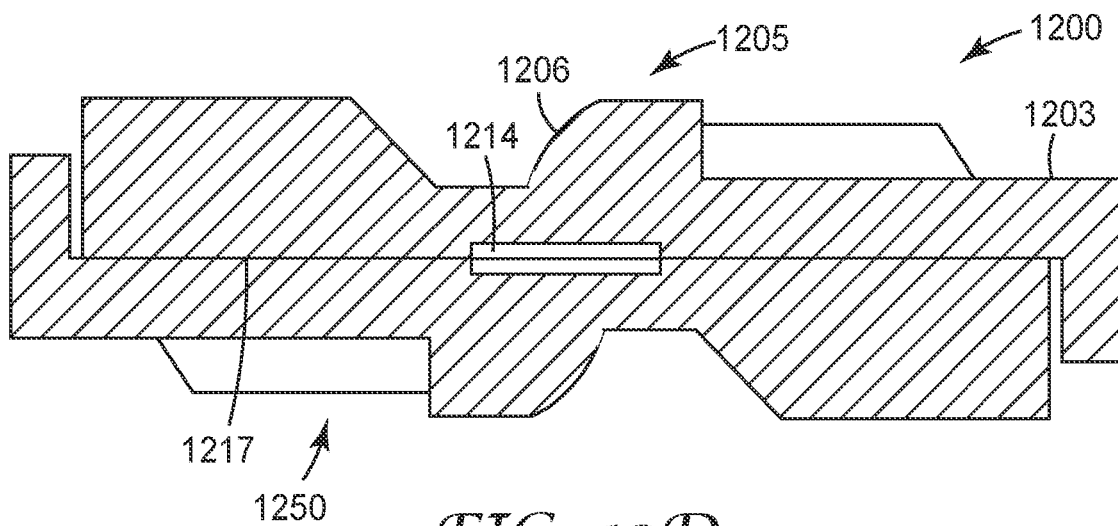
Figure 12E:
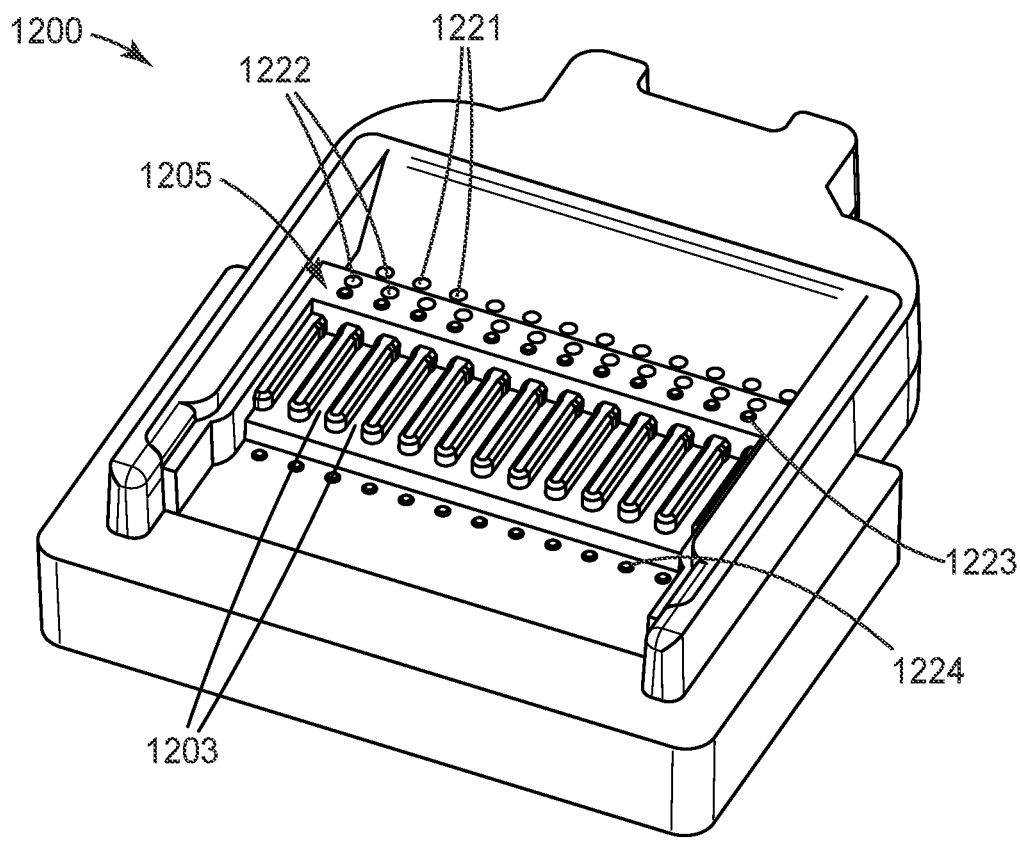

FIGS. 11A through 11C illustrate first and second sides 1101, 1102 of a mold according to some embodiments in which alignment features in addition to the planar mating surface are formed by the second mold side. FIG. 11A provides a perspective view of a first mold side 1101; FIG. 11B provides a perspective view of a second mold side 1102; and FIG. 11C is a more detailed perspective view of the first mold side 1101. FIGS. 12A through 12E show a unitary optical ferrule 1200 made using the mold of FIGS. 11A through 11C. FIG. 12A is a perspective view of a first side 1201 of the ferrule 1200; FIG. 12B is a perspective view of the second side 1202 of the ferrule 1200; FIG. 12C is a more detailed view of the first ferrule side 1201; FIG. 12D is a cross sectional view of the ferrule 1200 mated with a mating ferrule 1250; FIG. 12E is another perspective view of the first side 1201 of the ferrule 1200.

The first mold side 1101 includes first mold features 1103, 1105, 1112 and the second mold side 1102 includes second mold features 1112, 1113, 1114 and 1117. Mold features 1103 of mold side 1101 are configured to mold one or more elements 1203, e.g., grooves, U-shaped, V-shaped, or Y-shaped grooves, of the optical ferrule 1200 configured for receiving and securing an optical waveguide. Mold features 1105 are configured to mold one or more light affecting elements 1205 of the optical ferrule 1200 configured for affecting characteristics of light from the optical waveguide while propagating the light within the optical ferrule 1200.

Mold features 1105 include mold features 1105a, 1106, 1107, 1105b. Mold feature 1105a is configured to mold ferrule light redirecting feature 1205a. The ferrule light redirecting feature 1205a includes a curved lens 1206 and a planar surface 1207 disposed proximate to and/or at least partially surrounding the lens 1206. Mold features 1106 and 1107, respectively, are configured to mold the curved lens 1206 and a planar surface 1207. Mold feature 1105b is configured to mold ferrule feature 1205b which is an intermediate surface, e.g., a planar surface, disposed between the receiving element 1203 and light redirecting feature 1205a. Optical ferrule 1200 includes multiple receiving and securing elements 1203 and multiple light affecting elements 1205, however, some unitary optical ferrules can include a single receiving and securing element and a single light affecting element with an intermediate surface disposed therebetween.

Mold side 1101 also includes mold features 1111 configured to mold alignment feature 1211. Alignment feature 1211 of the optical ferrule 1200 is configured to control translation of the ferrule 1200 along a first lateral axis 121.

The second mold side 1102 includes mold features 1111, 1112, 1113, 1114, 1117 configured to mold ferrule features 1211, 1212, 1213, 1214, 1217. When mated with a mating optical ferrule (not shown), alignment features 1211 of the optical ferrule 1200 control translation of the ferrule 1200 along a first lateral axis 121. Features 1211 shown in the example optical ferrule 1200 of in FIGS. 12A and 12B are forward stops that engage with forward stops of a mating ferrule to set the mated distance between light affecting elements of the optical ferrule and light affecting elements of the mating ferrule. The forward stops 1211, when engaged with forward stops of the mating ferrule, may also control rotation of the optical ferrule 1200 around the thickness axis 123.

Mold features 1112, 1113 are configured to mold alignment features 1212, 1213 in the optical ferrule 1200. Mold side 1101 includes mold feature 1112a comprising spaced apart mold feature portions 1112a-1 and 1112a-2. Mold side 1102 includes mold feature 1112b that includes spaced apart mold feature portions 1112b-1 and 1112b-2. In the example ferrule 1200 shown in FIGS. 12A and 12B, alignment feature 1212 is a pin that fits into a compatible socket of a mating ferrule. Alignment feature 1213 is a socket that receives a pin of the mating ferrule. The pin 1212 includes spaced apart portions 1212a and 1212b. The pin 1212 and socket 1213 control translation of the optical ferrule 1200 along the second lateral axis 122 and may also control rotation of the optical ferrule 1200 around the thickness axis 123. Pin 1212 may be designed such that only the sides of the pin 1212 can come into contact with the mating socket, providing a lateral stop on either side of the pin 1212 and thereby controlling translation along the second lateral axis 122. The pin 1212 is designed to be slightly narrower that the socket 1213 to allow for manufacturing tolerances. Optionally, compliant features (not shown) could be designed into the pin and/or socket to allow for manufacturing tolerances. In some embodiments, the compliant features may provide flexible alignment. The pin or the socket, or both, can be fitted with compliant side features that facilitate centering the pin in the socket.

Mold feature 1117 is configured to mold the planar mating surface 1217 of the ferrule 1200. The planar mating surface 1217 controls translation of the ferrule 1200 along the thickness axis 123 and/or rotation of the ferrule along the first and second lateral axes 121, 122. Mold feature 1114 is configured to mold an optical output window 1214 in the planar mating surface 1217.

Optical ferrules and the molds used to make the optical ferrules according to various embodiments, including those illustrated in FIGS. 1-12 above, involve molded features, e.g., plastic molded features, configured to provide for propagation of light within the ferrule and between the ferrule and a mating ferrule that is aligned with the ferrule. For example, the light affecting elements may comprise lenses, e.g., curved lenses, configured to redirect light propagating in the ferrule. As previously described, the optical ferrules can include a planar mating surface having optical output window that is transparent to the propagating light, wherein the light propagating in the optical ferrule exits the optical ferrule after being transmitted by the optical output window.

The angular relationship of the mold features are controlled so that the resulting molded features of the ferrule are controlled to specified tolerances to allow for propagation of light within the ferrule between the waveguide, the light affecting element, and the optical output window. As best seen in FIGS. 11C and 12C, each light redirecting element 1205 may comprise a curved lens 1206 and at least one planar surface 1207 that may be proximate to and/or may partially or completely surround the lens 1206. The planar surface 1207 can be used as a first reference plane which sets the positional relationship of lens 1206 with other features of the ferrule 1200. For example the first reference surface 1207 is disposed at an angle with respect to a second reference surface of the optical ferrule, thus setting the angle of the lens relative to a feature of the receiving element 1203 and/or the longitudinal axis of a waveguide received by the receiving element 1203. In some embodiments, the mold features can be configured such that the angle between the first reference surface 1207 and the second reference surface is controlled to have a variation less than +/−3 degrees, less than +/−0.3 degrees, less than +/−0.03 degrees, less than +/−0.003 degrees, or even less than +/−0.0003 degrees. Although the lens 1106, 1206 and first reference plane 1107, 1207 mold and ferrule features are best seen in FIGS. 11C and 12C, it will be appreciated that similar features may be employed by any of the light affecting elements of molds and/or ferrules discussed herein. The angular relationships between the first reference plane and one or more second reference planes as discussed herein can apply to any of the mold and/or ferrule embodiments.

In some embodiments, the receiving elements may be a grooves, e.g., V-shaped, U-shaped, or Y-shaped grooves, and the second reference surface may be the bottoms of the grooves. In some embodiments, e.g., as best illustrated by FIGS. 11 and 12, the light affecting element 1205 includes an intermediate region 1205b extending between the receiving element 1203 and the light redirecting feature 1205a. The intermediate region 1205b comprises the second reference surface. In some implementations, the entire intermediate region 1205b may be a planar surface that provides the second reference surface. The second reference surface of the intermediate region 1205b may be substantially parallel to the bottom of the receiving element groove. In some embodiments, a planar surface, e.g., planar mating surface 1217, is disposed on the second side 1202 of the optical ferrule 1200 opposite the first side 1201 of the ferrule which includes the receiving 1203 and light affecting elements 1205. The planar surface 1217 on the second side of the ferrule may be or comprise the second reference surface. For example, in some implementations, the second reference surface may be the planar mating surface and/or may be the optical output window 1214 or other feature. The optical output window 1214 is transparent to light from the waveguide. In some embodiments, all or portions of the planar mating surface e.g., portions on either side of the optical window 1214, may be configured to be optically transparent to light. Optical transparency of the planar surface 1217 (or portions thereof) facilitate the use of interferometric analysis to determine angular relationships between the second reference surface of the planar mating surface, the receiving element, the intermediate portion, and/or the first reference surface of the light redirecting feature. The planar mating surface mold feature 1117 may be formed using any technique that provides optical transparency, e.g., grinding, polishing, diamond milling, etc.

In some embodiments, one or more fiducials may be made in the mold side (and may be molded into the ferrule) wherein the fiducials correspond to one or more ferrule features. For example, a mold side may be fabricated by one or more tools and each fiducial may be a divot (or other feature) that indicates a location of the tool used form a mold feature.

One fiducial may correspond to a plurality of ferrule features or one fiducial may correspond to a single ferrule feature. For example, in implementations that include multiple light affecting elements, multiple fiducials may be used wherein each of the fiducials corresponds to one of the light affecting elements. In some embodiments, as shown in FIGS. 12C and 12E, two or more fiducials 1221, 1222 may correspond to a light redirecting feature 1205a, e.g., each light redirecting feature 1205a may be disposed between two fiducials 1221, 1222.

According to some implementations, at least one fiducial may correspond to at least a single receiving element. In implementations that include multiple receiving elements, multiple fiducials may be used, wherein each of the fiducials corresponds to one of the receiving elements. For example, as shown in FIGS. 12C and 12E, two or more fiducials 1223, 1224 may correspond to one of the receiving elements 1203, e.g., each receiving element 1203 may be disposed between two fiducials 1223, 1224. Fiducials that correspond to one feature (or type of feature) may have the same shape or may differ in shape from fiducials that correspond to another feature (or type of feature).

Additional information regarding ferrules that may be formed by approaches described herein and alignment frames and connectors that may be used with ferrules formed by the disclosed approaches is provided in the following commonly owned and concurrently filed U.S. Patent Applications which are incorporated herein by reference: U.S. Patent Application Ser. 62/239,998, having the title "Connector with Latching Mechanism"; U.S. Patent Application Ser. 62/240,069, having the title "Optical Ferrules"; U.S. Patent Application Ser. 62/240,066, having the title "Ferrules, Alignment Frames and Connectors,"; U.S. Patent Application Ser. 62/240,008, having the title "Optical Cable Assembly with Retainer,"; U.S. Patent Application Ser. 62/240,000, having the title "Dust Mitigating Optical Connector,"; U.S. Patent Application Ser. 62/240,009, having the title "Optical Waveguide Registration Feature,"; U.S. Patent Application Ser. 62/240,010, having the title "Optical Coupling Device with Waveguide Assisted Registration,"; U.S. Patent Application 62/240,002, having the title "Optical Ferrules with Waveguide Inaccessible Space,"; U.S. Patent Application 62/240,003 having the title "Configurable Modular Connectors,"; and U.S. Patent Application 62/240,005, having the title "Hybrid Connectors,".

Items described in this disclosure include:

Item 1. A molded unitary optical ferrule comprising:
one or more parting line artifacts, the one or more parting line artifacts including a parting line artifact extending substantially around an external perimeter of the unitary ferrule, the parting line artifacts dividing a surface of the optical ferrule along a thickness axis into a first section and an opposing second section, wherein
the first section of the surface includes:
one or more elements configured for receiving and securing a optical waveguide;
one or more elements configured for affecting one or more characteristics of light from the optical waveguide while propagating the light within the unitary ferrule; and
one or more first alignment features that, when the ferrule is mated with a mating ferrule, control translation of the ferrule along a first lateral axis orthogonal to the thickness axis, translation of the ferrule along a second lateral axis orthogonal to both the thickness axis and the first lateral axis, and rotation of the ferrule around the thickness axis; and
the second section includes at least one second alignment feature that, when the ferrule is mated with a mating ferrule, controls translation of the ferrule along the thickness axis, and rotation of the ferrule around the first and second lateral axes.

Item 2. The ferrule of item 1, wherein the first lateral axis is a ferrule mating axis.

Item 3. The ferrule of any of items 1 through 2, wherein the one or more parting lines comprise one or more additional parting lines within the perimeter parting line.

Item 4. The ferrule of any of items 1 through 3, wherein the one or more characteristics of the light propagating within the unitary ferrule include one or more of a direction and divergence of the light.

Item 5. The ferrule of any of items 1 through 4 further comprising an output surface, the light propagating within the unitary ferrule exiting the ferrule after being transmitted by the output surface, the output surface disposed in the second section.

Item 6. The ferrule of item 5, wherein at least the output surface is coated with an optical antireflection coating.

Item 7. The ferrule of any of items 1 through 6, wherein the second alignment feature comprises at least one planar surface.

Item 8. The ferrule of item 7, wherein the at least one planar surface is a single planar surface.

Item 9. The ferrule of item 7, wherein the at least one planar surface are multiple parallel planar surfaces.

Item 10. The ferrule of item 7, wherein the at least one planar surface are multiple coplanar surfaces.

Item 11. The ferrule of item 7 wherein, during mating, the at least one planar surface slides on a planar surface of a mating ferrule.

Item 12. The ferrule of item 7, wherein the receiving and securing elements and the light affecting elements are disposed on a surface of the ferrule opposite the at least one planar surface.

Item 13. The ferrule of any of items 1 through 12, wherein the first alignment features comprise a pin disposed at a mating edge of the ferrule, the pin configured to engage a mating socket of the mating ferrule, the pin configured to control one or more of translation of the ferrule along the second lateral axis and translation of the ferrule along the first lateral axis.

Item 14. The ferrule of item 13, wherein the mating socket is formed by a hole through the thickness direction of the ferrule.

Item 15. The ferrule of item 13, wherein a leading edge of the pin is rounded.

Item 16. The ferrule of item 13, wherein a leading edge of the pin is angular.

Item 17. The ferrule of item 13, wherein clearance between a leading edge of the pin and a mating socket limits contact between the pin and socket to lateral surfaces of the pin.

Item 18. The ferrule of any of items 1 through 17, further comprising a spade portion at a mating edge of the optical ferrule.

Item 19. The ferrule of any of items 1 through 18, wherein the first alignment features includes a first stop disposed at a first side of the ferrule and a second stop disposed at a second side of the ferrule, the first and second stops controlling at least one of translation of the ferrule along the first lateral axis and rotation of the ferrule around the thickness axis.

Item 20. The ferrule of item 19, wherein the first alignment features comprise a first flexible arm disposed at a first side of the ferrule and a second flexible arm disposed at a second side of the ferrule, each of the first arm and the second arm including a contact element, each contact element configured to engage a side of a the mating ferrule.

Item 21. The ferrule of item 20, wherein engagement of the contact elements with the sides of the mating ferrule controls control translations of the ferrule along the second lateral axis.

Item 22. A molded unitary optical ferrule comprising:
one or more parting line artifacts, including a parting line artifact extending substantially around an external perimeter of the unitary ferrule, the parting line artifacts dividing a surface of the optical ferrule along the thickness axis into a first section and an opposing second section;
one or more elements configured for receiving and securing an optical waveguide;
one or more elements configured for affecting one or more characteristics of light from the optical waveguide while propagating the light within the unitary ferrule;
at least one planar surface configured to make contact with a planar mating surface of a mating ferrule during mating of the ferrule; and
one or more alignment features that, when the ferrule mates with the mating ferrule, primarily control rotation of the ferrule around a thickness axis, translation of the ferrule along a first lateral axis orthogonal to the thickness axis, and translation of the ferrule along a second lateral axis orthogonal to the thickness axis and to the first lateral axis, wherein the first section of the ferrule contains the one or more elements configured for receiving and securing the optical waveguide, the one or more elements configured for affecting one or more characteristics of light, and the alignment features and the second section of the ferrule includes the planar surface.

Item 23. The ferrule of item 22, wherein the at least one planar mating surface comprises a plurality of lands between a plurality of grooves.

Item 24. The ferrule of any of items 22 through 23, wherein the at least one planar mating surface comprises multiple planar mating surfaces.

Item 25. The ferrule of any of items 22 through 24, wherein the one or more alignment features comprises a socket formed by a hole through the thickness axis of the ferrule.

Item 26. A molded unitary optical ferrule comprising:
one or more parting line artifacts, including a parting line artifact extending substantially around an external perimeter of the unitary ferrule, the parting line artifacts dividing a surface of the optical ferrule along a thickness axis into a first section and an opposing second section;
one or more elements configured for receiving and securing an optical waveguide;
one or more elements configured for affecting one or more characteristics of light from the optical waveguide while propagating the light within the unitary ferrule;
a sliding surface that, during mating of the ferrule and a mating ferrule, facilitates sliding of the ferrule against a sliding surface of the mating ferrule along a ferrule mating axis, when the ferrule is mated with the mating ferrule, the sliding surface is configured to control rotation of the ferrule around the ferrule mating axis, translation of the ferrule along a thickness axis orthogonal to the ferrule mating axis, and rotation of the ferrule around a lateral axis orthogonal to the ferrule mating axis and the thickness axis; and
one or more alignment features that, when the ferrule is mated with the mating ferrule, primarily control translation of the ferrule along the ferrule mating axis, translation of the ferrule along the lateral axis, and rotation of the ferrule around the thickness axis, wherein the first section of the surface includes the receiving and securing elements, the light affecting elements, and the alignment features and the second section of the surface includes the sliding surface.

Item 27. The ferrule of item 26, wherein the sliding surface comprises multiple planar surfaces.

Item 28. An injection mold comprising:
a first mold side and a second mold side that fit together to define a cavity for molding a unitary optical ferrule, the cavity configured to separate along a parting axis,
the unitary optical ferrule being molded with a thickness axis parallel to the parting axis,
the first mold side having first mold features configured to mold:
a plurality of first elements configured for receiving and securing an optical waveguide and for affecting one or more characteristics of light from the optical waveguide while propagating the light within the unitary ferrule; and
one or more first alignment features that, when the ferrule is mated with a mating ferrule, control translation of the ferrule along a first lateral axis orthogonal to the thickness axis, translation of the ferrule along a second lateral axis orthogonal to both the thickness axis and the first lateral axis, and rotation of the ferrule around the thickness axis;
the second mold side having second mold features configured to mold one or more second alignment features that, when the ferrule is mated with a mating ferrule, control translation of the ferrule along the thickness axis, and rotation of the ferrule around the first and second lateral axes.

Item 29. The injection mold of item 28, wherein the first lateral axis is a mating axis of the optical ferrule.

Item 30. The injection mold of any of items 28 through 29, wherein the second mold side includes a feature configured to mold an optical output surface.

Item 31. The injection mold of any of items 28 through 30, wherein the one or more second alignment features comprises at least one planar surface.

Item 32. The injection mold of item 31, wherein the parting axis is substantially perpendicular to at least one planar surface.

Item 33. The injection mold of any of items 28 through 32, wherein the first mold side comprises a unitary mold insert that includes the first mold features.

Item 34. The injection mold of any of items 28 through 33, wherein the one or more second alignment features is a single planar surface.

Item 35. The injection mold of any of claims 28 through 33, wherein the one or more second alignment features is a multiple parallel planar surfaces.

Item 36. The injection mold of any of claims 28 through 33, wherein the one or more second alignment features is a multiple coplanar surfaces.

Item 37. The injection mold of any of items 28 through 36, wherein the first alignment features comprise a pin disposed at a mating edge of the ferrule, the pin configured to control one or both of translation of the ferrule along the first lateral axis and translation of the ferrule along both the second lateral axis.

Item 38. The injection mold of item 37, wherein a leading edge of the pin is rounded.

Item 39. The injection mold of item 37, wherein a leading edge of the pin is angular.

Item 40. The injection mold of any of items 28 through 39, wherein the first mold side includes a feature configured to mold a spade portion at a mating edge of the optical ferrule.

Item 41. The injection mold of any of items 28 through 40, wherein the first alignment features include a first stop disposed at a first side of the ferrule and a second stop disposed at a second side of the ferrule, the first and second stops controlling translation of the ferrule along the first lateral axis.

Item 42. An optical ferrule comprising:
one or more receiving elements, each receiving element configured for receiving and securing an optical waveguide; and
one or more light affecting elements, each light affecting element comprising:
 a light redirecting feature comprising:
  a curved lens in an optical path of light from the optical waveguide, the receiving element configured to align the waveguide with the lens; and
  a planar region at least partially surrounding the lens and comprising a first reference surface for the lens; and
 an intermediate surface that extends between the receiving element and the light redirecting feature and comprising a second reference surface, wherein the first reference surface is disposed at a predetermined angle with respect to the second reference surface that determines a positional relationship between the lens and the waveguide.

Item 43. The optical ferrule of item 42, wherein variation in the angle is controlled to less than +/−3 degrees.

Item 44. The optical ferrule of item 42, wherein variation in the angle is controlled to less than +/−0.3 degrees.

Item 45. The optical ferrule of item 42, wherein variation in the angle is controlled to less than +/−0.03 degrees.

Item 46. The optical ferrule of item 42, wherein variation in the angle is controlled to less than +/−0.003 degrees.

Item 47. The optical ferrule of item 42, wherein variation in the angle is controlled to less than +/−0.0003 degrees.

Item 48. The optical ferrule of item 42, wherein the intermediate surface is a planar surface.

Item 49. The optical ferrule of any of items 42 through 48, wherein the intermediate planar surface is disposed at a known angle with respect to a feature of the receiving element.

Item 50. The optical ferrule of any of items 42 through 49, wherein the receiving element is a groove and the receiving element feature is the bottom of the groove.

Item 51. The optical ferrule of item 50, wherein the groove is a U or V-shaped groove.

Item 52. The optical ferrule of item 50, wherein the intermediate surface is parallel with the feature of the receiving element.

Item 53. The optical ferrule of any of items 42 through 52, wherein the receiving elements and the light affecting elements are disposed on a first side of the optical ferrule and further comprising a planar mating surface disposed on a second side of the optical ferrule opposite the first side.

Item 54. The optical ferrule of item 53, wherein the planar mating surface is parallel to the feature of the receiving element.

Item 55. The optical ferrule of item 54, wherein the receiving element is a groove and the feature is the bottom of the groove.

Item 56. The optical ferrule of item 55, wherein the groove is a U or V-shaped groove.

Item 57. The optical ferrule of item 55, wherein the groove is a Y-shaped groove.

Item 58. The optical ferrule of item 53, wherein the second side further comprises an optical window configured to transmit the light out of the optical ferrule, wherein forward and rear portions of the planar mating surface are disposed on either side of the optical window.

Item 59. The optical ferrule of item 58, wherein at least one of the forward and rear regions of the planar mating surface is optically transparent.

Item 60. The optical ferrule of any of items 42 through 59, further comprising at least one fiducial corresponding to at least one of the light affecting element and the receiving element.

Item 61. The optical ferrule of any of items 42 through 60, further comprising at least a first fiducial corresponding to the light affecting element and at least a second fiducial corresponding to the receiving element.

Item 62. The optical ferrule of any of items 42 through 61, wherein the optical ferrule includes a plurality of light affecting elements and a plurality of receiving elements and further comprising at least one fiducial corresponding to at least one of the plurality of light affecting elements.

Item 63. The optical ferrule of any of items 42 through 62, wherein the optical ferrule includes a plurality of light affecting elements and a plurality of receiving elements and further comprising at least one fiducial corresponding to at least one of the plurality of receiving elements.

Item 64. The optical ferrule of items 42 through 63, wherein the optical ferrule includes a plurality of light affecting elements and a plurality of receiving elements and further comprising one or more fiducials corresponding to each of the plurality of receiving elements and one or more fiducials corresponding to each of the plurality of light affecting elements.

Item 65. An optical ferrule comprising:
one or more receiving elements, each receiving element configured for receiving and securing an optical waveguide; and
one or more light affecting elements, each light affecting element comprising:
a light redirecting feature comprising:
a curved lens in an optical path of light from the optical waveguide, the receiving element configured to align the waveguide with the lens; and
a planar region at least partially surrounding the lens the planar region comprising a first reference surface for the lens,
wherein the first reference surface is disposed at an angle with respect to a second reference surface of the optical ferrule that determines a positional relationship between the lens and the waveguide.

Item 66. The optical ferrule of item 65, wherein the receiving element comprises a groove and the second reference surface is the bottom of the groove.

Item 67. The optical ferrule of item 66, wherein the groove is a V-shaped or U-shaped groove.

Item 68. The optical ferrule of item 66, wherein the groove is a Y-shaped groove.

Item 69. The optical ferrule of any of claims 65 through 68, wherein variation in the angle is controlled to less than +/−3 degrees.

Item 70. The optical ferrule of any of items 65 through 68, wherein the variation in the angle is controlled to less than +/−0.3 degrees.

Item 71. The optical ferrule of any of items 65 through 68, wherein variation in the angle is controlled to less than +/−0.03 degrees.

Item 72. The optical ferrule of any of items 65 through 68, wherein variation in the angle is controlled to less than +/−0.003 degrees.

Item 73. The optical ferrule of any of items 65 through 68, wherein variation in the angle is controlled to less than +/−0.0003 degrees.

Item 74. The optical ferrule of any of items 65 through 73, wherein the light affecting element includes an intermediate surface that extends between the receiving element and the light affecting element and the intermediate surface comprises the second reference surface.

Item 75. The optical ferrule of any of items 65 through 74, wherein the receiving elements and the light affecting elements are disposed on a first side of the optical ferrule and further comprising a planar surface disposed on a second side of the optical ferrule opposite the first side and the planar surface comprises the second reference surface.

Item 76. The optical ferrule of item 75, wherein the second side further comprises an optical window configured to transmit the light out of the optical ferrule, wherein forward and rear portions of the planar mating surface are disposed on either side of the optical window.

Item 77. The optical ferrule of item 75, wherein at least one of the forward and rear regions of the planar mating surface is optically transparent.

Item 78. The optical ferrule of any of items 65 through 77, further comprising at least one fiducial corresponding to at least one of the light affecting element and the receiving element.

Item 79. The optical ferrule of any of items 65 through 78, further comprising at least a first fiducial corresponding to the light affecting element and at least a second fiducial corresponding to the receiving element.

Item 80. The optical ferrule of any of items 65 through 79, wherein the optical ferrule includes a plurality of light affecting elements and a plurality of receiving elements and further comprising at least one fiducial corresponding to at least one of the plurality of light affecting elements.

Item 81. The optical ferrule of any of items 65 through 80, wherein the optical ferrule includes a plurality of light affecting elements and a plurality of receiving elements and further comprising at least one fiducial corresponding to at least one of the plurality of receiving elements.

Item 82. The optical ferrule of any of items 65 through 81, wherein the optical ferrule includes a plurality of light affecting elements and a plurality of receiving elements and further comprising one or more fiducials corresponding to each of the plurality of receiving elements and one or more fiducials corresponding to each of the plurality of light affecting elements.

Item 83. The optical ferrule of any of items 65 through 82, wherein the first reference surface provides a local reference for the lens.

Item 84. An injection mold comprising:
a first mold side and a second mold side that fit together to define a cavity for molding a unitary optical ferrule, the cavity configured to separate along a parting axis, the unitary optical ferrule being molded with a thickness axis parallel to the parting axis, the first mold side having mold features configured to mold:
one or more light affecting elements, each light affecting element comprising:
a light redirecting feature comprising:
a curved lens in an optical path of light from the optical waveguide, the receiving element configured to align the waveguide with the lens; and
a planar region at least partially surrounding the lens and comprising a first reference surface for a position of the lens,
wherein the first reference surface is disposed at an angle with respect to a second reference surface of the optical ferrule that determines a positional relationship between the lens and the waveguide.

Item 85. The injection mold of item 84, wherein the receiving element comprises a groove and the second reference surface is the bottom of the groove.

Item 86. The injection mold of item 85, wherein the groove is a V-shaped or U-shaped groove.

Item 87. The injection mold of item 85, wherein the groove is a Y-shaped groove.

Item 88. The injection mold of item 84, wherein variation in the angle is controlled to less than +/−3 degrees.

Item 89. The injection mold of item 84, wherein the variation in the angle is controlled to less than +/−0.3 degrees.

Item 90. The injection mold of item 84, wherein variation in the angle is controlled to less than +/−0.03 degrees.

Item 91. The injection mold of item 84, wherein variation in the angle is controlled to less than +/−0.003 degrees.

Item 92. The injection mold of item 84, wherein variation in the angle is controlled to less than +/−0.0003 degrees.

Item 93. The injection mold of any of items 84 through 92, wherein the light affecting element includes an intermediate surface that extends between the receiving element and the light affecting element and the intermediate surface comprises the second reference surface.

Item 94. The injection mold of items 84 through 93, wherein the receiving elements and the light affecting elements are disposed on a first side of the optical ferrule and further comprising a planar surface disposed on a second side of the optical ferrule opposite the first side and the planar surface comprises the second reference surface.

Item 95. The injection mold of item 94, wherein the second side further comprises an optical window configured to transmit the light out of the optical ferrule, wherein forward and rear portions of the planar mating surface are disposed on either side of the optical window.

Item 96. The injection mold of item 95, wherein at least one of the forward and rear regions of the planar mating surface is optically transparent.

Item 97. The injection mold of any of items 84 through 96, wherein the first mold side includes at least one mold feature configured to mold at least one fiducial corresponding to at least one of the light affecting element and the receiving element.

Item 98. The injection mold of any of items 84 through 97, wherein the first mold side includes at least one mold feature configured to mold at least a first fiducial corresponding to the light affecting element and at least one mold feature configured to mold at least a second fiducial corresponding to the receiving element.

Item 99. The injection mold of any of items 84 through 98, wherein mold features are configured to mold a plurality of light affecting elements, a plurality of receiving elements and at least one fiducial corresponding to at least one of the plurality of light affecting elements.

Item 100. The injection mold of any of items 84 through 99, wherein the mold features are configured to mold a plurality of light affecting elements, a plurality of receiving elements and at least one fiducial corresponding to at least one of the plurality of receiving elements.

Item 101. The injection mold of any of items 84 through 100, wherein the mold features are configured to mold a plurality of light affecting elements, a plurality of receiving elements, one or more fiducials corresponding to each of the plurality of receiving elements, and one or more fiducials corresponding to each of the plurality of light affecting elements.

Item 102. The injection mold of any of items 84 through 101, wherein the first reference surface provides a local reference for the lens.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various modifications and alterations of the embodiments discussed above will be apparent to those skilled in the art, and it should be understood that this disclosure is not limited to the illustrative embodiments set forth herein. The reader should assume that features of one disclosed embodiment can also be applied to all other disclosed embodiments unless otherwise indicated. It should also be understood that all U.S. patents, patent applications, patent application publications, and other patent and non-patent documents referred to herein are incorporated by reference, to the extent they do not contradict the foregoing disclosure.

The invention claimed is:

1. A molded unitary optical ferrule comprising:
a molded first section molded by a first side of a mold molding one or more receiving elements of the molded unitary optical ferrule configured to receive and secure an optical fiber, and molding a light affecting element of the molded unitary optical ferrule for affecting one or more of a direction and a divergence of light propagating within the molded unitary optical ferrule, the affected light exiting the molded unitary optical ferrule through an output surface thereof; and
an opposite molded second section molded by an opposite second side of the mold molding the output surface of the molded unitary optical ferrule, wherein the molded second section further comprises at least one second alignment feature, the second alignment feature comprising at least one planar surface, wherein the at least one planar surface is a first planar mating surface configured to slide on a planar mating surface of a mating optical ferrule and the first planar mating surface comprises a plurality of lands between a plurality of grooves.

2. The molded unitary optical ferrule of claim 1, wherein the molded first section further comprises at least one first alignment feature.

3. The molded unitary optical ferrule of claim 1, wherein, during mating, the at least one planar surface slides on a planar surface of a mating optical ferrule.

* * * * *